United States Patent
Fukudome et al.

(10) Patent No.: US 12,298,048 B2
(45) Date of Patent: May 13, 2025

(54) EXPANSION VALVE

(71) Applicant: EAGLE INDUSTRY CO., LTD., Tokyo (JP)

(72) Inventors: Kohei Fukudome, Tokyo (JP); Toshinori Kanzaki, Tokyo (JP); Keigo Shirafuji, Tokyo (JP); Keichi Urushiyama, Tokyo (JP); Takahiro Ejima, Tokyo (JP); Kenshiro Furukawa, Tokyo (JP); Akihiro Hashiguchi, Tokyo (JP); Daichi Kurihara, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 152 days.

(21) Appl. No.: 18/019,057

(22) PCT Filed: Jul. 27, 2021

(86) PCT No.: PCT/JP2021/027772
§ 371 (c)(1),
(2) Date: Jan. 31, 2023

(87) PCT Pub. No.: WO2022/030315
PCT Pub. Date: Feb. 10, 2022

(65) Prior Publication Data
US 2023/0280075 A1    Sep. 7, 2023

(30) Foreign Application Priority Data

Aug. 4, 2020 (JP) .................................. 2020-132545

(51) Int. Cl.
*F25B 41/345* (2021.01)
*F25B 41/32* (2021.01)

(52) U.S. Cl.
CPC ............ *F25B 41/345* (2021.01); *F25B 41/32* (2021.01); *F25B 2341/06* (2013.01)

(58) Field of Classification Search
CPC .... F25B 41/32; F25B 41/345; F25B 2341/06; F25B 2400/0411
See application file for complete search history.

(56) References Cited

U.S. PATENT DOCUMENTS

| | | | |
|---|---|---|---|
| 813,555 A | 2/1906 | Hayden | F16K 1/34 |
| 821,758 A | 5/1906 | Smith | F16K 1/46 |

(Continued)

FOREIGN PATENT DOCUMENTS

| | | | |
|---|---|---|---|
| CN | 107339442 | 11/2017 | F16K 1/02 |
| CN | 209146387 | 7/2019 | F16K 31/42 |

(Continued)

OTHER PUBLICATIONS

International Search Report and Written Opinion and International Preliminary Report on Patentability issued in PCT/JP2022/012340, dated May 31, 2022, 24 pages.

(Continued)

*Primary Examiner* — Jonathan Bradford
(74) *Attorney, Agent, or Firm* — HAYES SOLOWAY P.C.

(57) ABSTRACT

An expansion valve having a high valve opening adjustment accuracy includes: a valve housing which is provided with an inlet port allowing a refrigerant from a condenser to pass therethrough and an outlet port allowing a refrigerant toward an evaporator to pass therethrough; a valve body which is driven by a solenoid; a valve seat on which the valve body sits; and an urging member configured to urge the valve body in a valve closing direction, a space is formed on a valve opening direction side of the valve body, and the refrigerant on the valve closing direction side in relation to the valve body flows into the space.

12 Claims, 12 Drawing Sheets

(56) References Cited

U.S. PATENT DOCUMENTS

| | | | | |
|---|---|---|---|---|
| 877,865 A | 1/1908 | Ricksecker | | F16K 1/34 |
| 1,449,876 A | 3/1923 | Erastus | | F01L 3/20 |
| 1,614,002 A | 1/1927 | Horton | | A62C 35/605 |
| 1,758,471 A | 5/1930 | Julius | | F16K 1/46 |
| 1,800,127 A | 4/1931 | Wilson | | F16K 1/34 |
| 1,847,385 A | 3/1932 | Franklin | | F16K 1/34 |
| 2,196,798 A | 4/1940 | Otto | | F16K 1/36 |
| 2,267,515 A | 12/1941 | Wilcox | | F16K 31/0627 |
| 2,331,503 A | 10/1943 | Ray | | F16K 41/10 |
| 2,797,061 A | 6/1957 | Buchanan | | F16K 31/06 |
| 2,887,293 A | 5/1959 | Fred | | F16K 31/60 |
| 2,893,685 A | 7/1959 | Camp | | F16K 1/36 |
| 2,898,082 A | 8/1959 | Von Almen | | F04B 53/1027 |
| 3,049,332 A | 8/1962 | Webster | | F16K 1/02 |
| 3,054,422 A | 9/1962 | Napolitano | | F16K 1/385 |
| 3,070,120 A | 12/1962 | Wendt | | F16K 1/46 |
| 3,185,438 A | 5/1965 | Smirra | | F16K 1/34 |
| 3,204,925 A | 9/1965 | Enrico | | F16K 1/50 |
| 3,230,973 A | 1/1966 | Rudolf | | F16K 1/46 |
| 3,278,156 A | 10/1966 | Callahan | | F16K 41/10 |
| 3,360,304 A | 12/1967 | Adams | | B61K 7/12 |
| 3,394,732 A | 7/1968 | Constantine | | F16K 1/36 |
| 3,426,741 A | 2/1969 | Haagen | | F01L 3/02 |
| 3,483,888 A | 12/1969 | Hugo | | F16K 15/046 |
| 3,623,699 A | 11/1971 | Matousek | | F16K 1/46 |
| 3,627,257 A | 12/1971 | Stamfil | | F16K 31/0693 |
| 3,679,169 A | 7/1972 | Bedo | | F16K 41/02 |
| 3,854,495 A | 12/1974 | Cowley | | G05D 16/0663 |
| 4,085,921 A | 4/1978 | Ueda et al. | | F16K 31/06 |
| 4,149,699 A | 4/1979 | Speckmann | | F16K 41/00 |
| 4,318,532 A | 3/1982 | Winkler | | F16K 1/34 |
| 4,345,739 A | 8/1982 | Wheatley | | F16K 1/2263 |
| 4,364,615 A | 12/1982 | Euler | | F16C 27/04 |
| 4,417,601 A | 11/1983 | Bennett | | A62C 31/12 |
| 4,448,038 A | 5/1984 | Barbier | | F25B 41/34 |
| 4,474,356 A | 10/1984 | Baumann | | F16K 1/12 |
| 4,579,145 A | 4/1986 | Leiber | | F16H 61/0251 |
| 4,615,358 A | 10/1986 | Hammond | | F15B 13/0402 |
| 4,617,889 A | 10/1986 | Nishimiya | | F02D 31/00 |
| 4,632,358 A | 12/1986 | Orth | | F25B 41/347 |
| 4,778,150 A | 10/1988 | Pratt | | F16K 41/043 |
| 4,825,909 A | 5/1989 | Martin | | F15B 13/02 |
| 4,848,729 A | 7/1989 | Danzy | | F16K 1/46 |
| 4,895,192 A | 1/1990 | Mortenson | | F01M 11/04 |
| 4,915,355 A | 4/1990 | Fort | | F16K 1/46 |
| 4,917,150 A | 4/1990 | Koch | | F16K 31/0606 |
| 4,922,957 A | 5/1990 | Johnson | | F16K 1/46 |
| 4,923,173 A | 5/1990 | Szymaszek | | F16K 1/36 |
| 4,979,542 A | 12/1990 | Mesenich | | F02M 47/027 |
| 4,998,559 A | 3/1991 | McAuliffe | | F16H 61/0251 |
| 5,011,116 A | 4/1991 | Alberts | | F16K 47/00 |
| 5,060,695 A | 10/1991 | McCabe | | G05D 16/2024 |
| 5,217,047 A | 6/1993 | McCabe | | F16H 16/0251 |
| 5,232,195 A | 8/1993 | Torrielli | | H01F 7/1607 |
| 5,246,205 A | 9/1993 | Gillingham | | F01N 3/0212 |
| 5,263,694 A | 11/1993 | Smith | | B60G 15/068 |
| 5,364,066 A | 11/1994 | Dorste | | F25B 41/35 |
| 5,409,036 A | 4/1995 | Ahmadian | | H01F 7/14 |
| 5,439,027 A | 8/1995 | Layton | | F16K 1/385 |
| 5,702,235 A | 12/1997 | Hirota | | F04B 27/1804 |
| 5,778,932 A | 7/1998 | Alexander | | G05D 16/2024 |
| 6,010,312 A | 1/2000 | Suitou | | F04B 27/1804 |
| 6,019,118 A | 2/2000 | Voggenreiter et al. | | F16K 51/02 |
| 6,155,391 A | 12/2000 | Kashiwagi et al. | | F16F 9/348 |
| 6,161,585 A | 12/2000 | Kolchinsky | | F05D 16/2024 |
| 6,257,836 B1 | 7/2001 | Ota et al. | | 417/222.02 |
| 6,315,266 B1 | 11/2001 | Hirota | | F16K 31/406 |
| 6,321,995 B1 * | 11/2001 | Badovick | | F25B 41/335 236/92 B |
| 6,361,283 B1 | 3/2002 | Ota | | F04B 27/1084 |
| 6,481,976 B2 | 11/2002 | Kimura | | F04B 27/1804 |
| 6,626,000 B1 * | 9/2003 | Meyer | | F25B 41/345 62/DIG. 17 |
| 6,776,182 B2 | 8/2004 | Ishitoya | | F16K 25/00 |
| 6,811,140 B1 | 11/2004 | Maini | | F16K 1/46 |
| 6,840,504 B2 | 1/2005 | Hagiwara | | F16K 1/36 |
| 6,959,718 B2 | 11/2005 | Kayahara | | F16K 31/0655 |
| 7,007,917 B2 | 3/2006 | Choi | | F16K 31/0655 |
| 7,040,595 B2 | 5/2006 | Hirota | | F16K 31/02 |
| 7,481,417 B2 | 1/2009 | Mayer | | F16K 51/02 |
| 7,533,687 B2 | 5/2009 | Uemura | | F16K 27/048 |
| 7,726,949 B2 | 6/2010 | Taguchi | | F04B 1/26 |
| 7,758,014 B2 | 7/2010 | Lancaster | | F16K 1/04 |
| 7,832,653 B2 | 11/2010 | Yukimoto | | F25B 41/39 |
| 7,958,908 B2 | 6/2011 | Cho et al. | | F15B 13/044 |
| 7,971,797 B2 | 7/2011 | Habermann | | F16K 31/002 |
| 8,021,124 B2 | 9/2011 | Umemura | | F04B 27/1804 |
| 8,079,827 B2 | 12/2011 | Iwa | | F04B 27/1804 |
| 8,128,061 B2 | 3/2012 | Uemura | | F04B 27/1804 |
| 8,225,818 B1 | 7/2012 | Stephens | | F15B 13/0442 |
| 8,328,163 B2 | 12/2012 | Boesch | | F16K 1/36 |
| 8,387,947 B2 | 3/2013 | Uemura | | F04B 27/1804 |
| 8,469,337 B1 | 6/2013 | Hoeptner | | F16K 1/36 |
| 8,579,257 B2 | 11/2013 | Taylor | | F16K 1/46 |
| 8,651,826 B2 | 2/2014 | Futakuchi | | F04B 27/1804 |
| 8,684,037 B2 | 4/2014 | Huynh | | F15B 13/01 |
| 9,022,346 B2 | 5/2015 | Najmolhoda | | F16K 31/0613 |
| 9,027,598 B2 | 5/2015 | Schneider | | F16K 31/0613 |
| 9,132,714 B2 | 9/2015 | Futakuchi | | F04B 27/1804 |
| 9,243,733 B2 | 1/2016 | Lively | | G05D 16/02 |
| 9,297,373 B2 | 3/2016 | Bagagli | | F16K 15/026 |
| 9,383,021 B2 | 7/2016 | Kosmehl | | F16K 1/36 |
| 9,400,027 B2 | 7/2016 | Imaizumi | | F16F 1/32 |
| 9,453,518 B2 | 9/2016 | Schulz | | F15B 13/043 |
| 9,470,337 B2 | 10/2016 | Roper | | F16K 1/36 |
| 9,581,149 B2 | 2/2017 | Ota et al. | | F04B 27/1804 |
| 9,581,150 B2 | 2/2017 | Ota et al. | | F04B 27/1804 |
| 9,638,082 B2 | 5/2017 | Fujita | | F16K 25/00 |
| 9,732,874 B2 | 8/2017 | Saeki | | F16K 31/0603 |
| 9,874,286 B2 | 1/2018 | Bagagli | | F16K 15/12 |
| 10,113,539 B2 | 10/2018 | Sugamura | | F04B 27/1804 |
| 10,378,657 B2 | 8/2019 | Lin | | F16K 1/46 |
| 10,519,944 B2 | 12/2019 | Taguchi | | F04B 27/1804 |
| 10,557,463 B2 | 2/2020 | Sugamura | | F04B 27/1804 |
| 10,690,125 B2 | 6/2020 | Hayama | | F04B 27/18 |
| 10,784,804 B2 | 9/2020 | Sasaki | | H02P 25/022 |
| 10,837,431 B2 | 11/2020 | Tonegawa | | F04B 49/22 |
| 11,085,431 B2 | 8/2021 | Fukudome et al. | | F16K 31/06 |
| 11,092,244 B1 | 8/2021 | Hu | | F16K 1/36 |
| 11,480,166 B2 | 10/2022 | Hayama et al. | | F04B 27/10 |
| 2001/0003573 A1 | 6/2001 | Kimura et al. | | 417/222.2 |
| 2002/0134444 A1 | 9/2002 | Isobe | | F16K 17/041 |
| 2003/0145615 A1 | 8/2003 | Sasaki | | F16K 31/0637 |
| 2003/0197141 A1 | 10/2003 | Kajitani | | F16L 47/00 |
| 2003/0202885 A1 | 10/2003 | Taguchi | | F04B 49/00 |
| 2004/0045305 A1 | 3/2004 | Murase | | F25B 49/022 |
| 2004/0165994 A1 | 8/2004 | Umemura | | F04B 27/1804 |
| 2005/0076959 A1 | 4/2005 | Yamamoto | | F16K 31/0624 |
| 2005/0151310 A1 | 7/2005 | Rodeffer | | F16F 1/32 |
| 2005/0163624 A1 | 7/2005 | Taguchi | | F04B 27/1804 |
| 2007/0214814 A1 | 9/2007 | Umemura et al. | | |
| 2007/0264134 A1 | 11/2007 | Hirota | | F04B 27/1804 |
| 2008/0138213 A1 | 6/2008 | Umemura et al. | | 417/222.2 |
| 2008/0175727 A1 | 7/2008 | Umemura et al. | | F04B 49/22 |
| 2009/0108221 A1 | 4/2009 | Umemura et al. | | 251/129.15 |
| 2009/0114871 A1 | 5/2009 | Iwa | | F04B 27/14 |
| 2009/0183786 A1 | 7/2009 | Iwa | | 137/487.5 |
| 2009/0256091 A1 | 10/2009 | Nordstrom | | F16K 31/0613 |
| 2010/0019406 A1 | 1/2010 | Shoji et al. | | F16K 1/34 |
| 2010/0051838 A1 | 3/2010 | Uemura | | F04B 27/1804 |
| 2010/0282991 A1 | 11/2010 | Okamoto | | F16K 31/02 |
| 2011/0041941 A1 | 2/2011 | Sonsterod | | F16K 15/14 |
| 2011/0061749 A1 | 3/2011 | Okamoto | | F16K 31/0655 |
| 2011/0089352 A1 | 4/2011 | Morgan | | F16K 11/0716 |
| 2011/0203888 A1 | 8/2011 | Sonsterod | | F16F 9/32 |
| 2012/0056113 A1 | 3/2012 | Tano | | F04B 27/1804 |
| 2012/0097881 A1 | 4/2012 | Aoyama | | F16K 1/425 |
| 2012/0198992 A1 | 8/2012 | Futakuchi et al. | | 91/505 |
| 2012/0198993 A1 | 8/2012 | Fukudome | | 91/505 |
| 2012/0211686 A1 | 8/2012 | Okamoto | | F16K 31/0655 |
| 2013/0291963 A1 | 11/2013 | Futakuchi et al. | | 137/487.5 |
| 2014/0099214 A1 | 4/2014 | Fukudome | | 417/222.2 |
| 2014/0109973 A1 | 4/2014 | Neumeister | | C23C 16/4412 |

(56) References Cited

U.S. PATENT DOCUMENTS

| | | | |
|---|---|---|---|
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0004010 A1 | 1/2015 | Saeki | F04B 27/1804 |
| 2015/0021131 A1 | 1/2015 | Wootten | F16F 9/348 |
| 2015/0027573 A1 | 1/2015 | Ochiai | F15B 13/0402 |
| 2015/0044067 A1 | 2/2015 | Ota et al. | F04B 27/1804 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0276065 A1 | 10/2015 | Yoshida | F16K 3/246 |
| 2015/0345655 A1 | 12/2015 | Higashidozono | 137/624.27 |
| 2016/0053755 A1 | 2/2016 | Taguchi | F04B 49/22 |
| 2016/0208954 A1 | 7/2016 | Ito et al. | F16K 39/02 |
| 2016/0290326 A1 | 10/2016 | Sugamura | F04B 27/1804 |
| 2017/0261113 A1 | 9/2017 | Sato | F16K 31/0675 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0238455 A1 | 8/2018 | Yazawa | F16K 31/508 |
| 2018/0291888 A1 | 10/2018 | Tonegawa et al. | F04B 49/22 |
| 2018/0372129 A1 | 12/2018 | Kato et al. | F15B 13/04 |
| 2019/0162175 A1 | 5/2019 | Higashidozono | F04B 27/18 |
| 2019/0293061 A1 | 9/2019 | Kume | F16K 11/048 |
| 2020/0011444 A1 | 1/2020 | Morita et al. | F16K 31/04 |
| 2020/0032781 A1 | 1/2020 | Higashidozono | F16K 31/0624 |
| 2020/0088178 A1 | 3/2020 | Fukudome et al. | F16K 31/06 |
| 2020/0173580 A1 | 6/2020 | Sandeck | F16K 51/02 |
| 2020/0309105 A1 | 10/2020 | Hayama et al. | F04B 27/18 |
| 2020/0318624 A1 | 10/2020 | Hayama | F04B 27/18 |
| 2020/0325881 A1 | 10/2020 | Hayama et al. | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |
| 2021/0404570 A1 | 12/2021 | Hayama et al. | F16K 17/04 |

FOREIGN PATENT DOCUMENTS

| | | | |
|---|---|---|---|
| CN | 110260001 | 9/2019 | F16K 15/016 |
| CN | 110735965 | 1/2020 | F16K 1/00 |
| CN | 111279076 | 6/2020 | F04B 27/18 |
| CN | 111316028 | 6/2020 | F16K 31/06 |
| CN | 111417780 | 7/2020 | F04B 27/18 |
| DE | 2414893 | 10/1975 | F16K 15/00 |
| DE | 2706439 | 8/1978 | F16K 11/04 |
| DE | 102006033747 | 1/2008 | F16K 31/00 |
| EP | 0229315 | 7/1987 | F02M 3/07 |
| EP | 1519128 | 3/2005 | F25B 41/06 |
| EP | 2180217 | 4/2010 | F16K 31/06 |
| EP | 2594794 | 5/2013 | F04B 27/18 |
| EP | 3056778 | 8/2016 | F16K 31/04 |
| EP | 3258103 | 12/2017 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 5682358 | 7/1981 | G03B 15/00 |
| JP | 5740945 | 8/1982 | B21B 39/14 |
| JP | H04171361 | 6/1992 | F04B 49/00 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H10220926 | 8/1998 | F25B 41/06 |
| JP | 11287281 | 10/1999 | F16F 9/348 |
| JP | 200020763 | 8/2000 | F16K 31/06 |
| JP | 2000304152 | 11/2000 | F16D 48/02 |
| JP | 2001012534 | 1/2001 | F16F 9/46 |
| JP | 2001153495 | 6/2001 | F16K 31/06 |
| JP | 2001153498 | 6/2001 | F16K 31/06 |
| JP | 2001165055 | 6/2001 | F04B 27/14 |
| JP | 2002216803 | 8/2002 | H01M 8/02 |
| JP | 2003004160 | 1/2003 | F16K 31/04 |
| JP | 2003301772 | 10/2003 | |
| JP | 2003314745 | 11/2003 | F16K 51/02 |
| JP | 2003322086 | 11/2003 | F04B 49/00 |
| JP | 2004003468 | 1/2004 | F04B 27/14 |
| JP | 2004101163 | 4/2004 | F25B 41/06 |
| JP | 2005307817 | 11/2005 | F04B 27/14 |
| JP | 2005351605 | 12/2005 | F16K 1/38 |
| JP | 2006153204 | 6/2006 | F16K 31/04 |
| JP | 2007247512 | 9/2007 | F04B 27/14 |
| JP | 2008157031 | 7/2008 | F04B 27/14 |
| JP | 2008190574 | 8/2008 | F16K 31/06 |
| JP | 2009030752 | 2/2009 | F16K 31/06 |
| JP | 2009115204 | 5/2009 | F16K 31/04 |
| JP | 2009221965 | 10/2009 | F04B 27/14 |
| JP | 2009275550 | 11/2009 | F04B 49/00 |
| JP | 2010019406 | 1/2010 | F16K 31/04 |
| JP | 2011501798 | 1/2011 | F16K 15/14 |
| JP | 2011525962 | 9/2011 | F16F 9/32 |
| JP | 4822735 | 11/2011 | A43B 23/24 |
| JP | 2012144986 | 8/2012 | F04B 27/14 |
| JP | 2012211579 | 11/2012 | F04B 27/14 |
| JP | 2013024135 | 2/2013 | F04B 27/14 |
| JP | 5167121 | 3/2013 | F04B 27/14 |
| JP | 2013100915 | 5/2013 | F15B 31/06 |
| JP | 2014080927 | 5/2014 | F04B 27/16 |
| JP | 2014092207 | 5/2014 | F16K 31/06 |
| JP | 2014095463 | 5/2014 | F16K 31/06 |
| JP | 2014194180 | 10/2014 | F04B 27/14 |
| JP | 2015075054 | 4/2015 | F04B 27/14 |
| JP | 20151168 | 5/2015 | F04B 27/14 |
| JP | 2015137546 | 7/2015 | F04B 27/14 |
| JP | 2015178795 | 10/2015 | F04B 27/14 |
| JP | 5983539 | 8/2016 | F04B 27/18 |
| JP | 2016196825 | 11/2016 | F04B 27/18 |
| JP | 2016196876 | 11/2016 | F04B 27/18 |
| JP | 2016205404 | 12/2016 | F04B 27/18 |
| JP | 6135521 | 5/2017 | F04B 27/18 |
| JP | 2017089832 | 5/2017 | F16K 31/06 |
| JP | 2017180525 | 10/2017 | F16K 31/04 |
| JP | 2018015739 | 2/2018 | C02F 1/46 |
| JP | 2018035840 | 5/2018 | |
| JP | 2018115684 | 7/2018 | B60G 17/08 |
| JP | 2018135954 | 8/2018 | F16K 31/06 |
| JP | 2018179087 | 11/2018 | F16K 31/06 |
| JP | 2019131725 | 8/2019 | |
| JP | 2019138473 | 8/2019 | F16K 1/36 |
| JP | 2019167982 | 10/2019 | F16K 1/38 |
| JP | 2020041606 | 3/2020 | F16K 1/44 |
| KR | 20-0400543 | 10/2005 | B60S 1/52 |
| KR | 1020080011375 | 2/2008 | F04B 27/14 |
| KR | 102019001499 | 1/2019 | F16K 31/06 |
| WO | WO9218795 | 10/1992 | F16K 1/34 |
| WO | WO2006090760 | 8/2006 | F04B 27/18 |
| WO | WO2007119380 | 10/2007 | F04B 27/14 |
| WO | WO2009025298 | 2/2009 | F16K 31/06 |
| WO | WO2011114841 | 9/2011 | F04B 27/14 |
| WO | WO2011132438 | 10/2011 | F16K 31/06 |
| WO | WO2012077439 | 6/2012 | F04B 27/14 |
| WO | WO2014119594 | 8/2014 | F04B 27/14 |
| WO | WO2014148367 | 9/2014 | F16K 31/06 |
| WO | WO2018124156 | 7/2018 | F16K 31/06 |
| WO | WO2019131482 | 7/2019 | F04B 27/18 |
| WO | WO2020110925 | 11/2019 | F04B 27/18 |
| WO | WO2020013169 | 1/2020 | F04B 27/18 |

OTHER PUBLICATIONS

International Search Report and Written Opinion and International Preliminary Report on Patentability issued in PCT/JP2021/027769, dated Sep. 7, 2021, 24 pages.

International Search Report and Written Opinion and International Preliminary Report on Patentability issued in PCT/JP2021/027762, dated Oct. 5, 2021, 20 pages.

International Search Report and Written Opinion and International Preliminary Report on Patentability issued in PCT/JP2021/027766, dated Sep. 7, 2021, 24 pages.

International Search Report and Written Opinion and International Preliminary Report on Patentability issued in PCT/JP2021/027770, dated Oct. 5, 2021, 20 pages.

(56) References Cited

OTHER PUBLICATIONS

International Search Report and Written Opinion and International Preliminary Report on Patentability issued in PCT/JP2021/027772, dated Sep. 21, 2021, 24 pages.
International Search Report and Written Opinion and International Preliminary Report on Patentability issued in PCT/JP2021/027767, dated Sep. 7, 2021, 22 pages.
International Search Report and Written Opinion and International Preliminary Report on Patentability issued in PCT/JP2021/030007, dated Nov. 2, 2021, 18 pages.
International Search Report and Written Opinion and International Preliminary Report on Patentability issued in PCT/JP2021/034996, dated Dec. 12, 2021, 18 pages.
International Search Report and Written Opinion and International Preliminary Report on Patentability issued in PCT/JP2021/034990, dated Oct. 19, 2021, 18 pages.
International Search Report and Written Opinion and International Preliminary Report on Patentability issued in PCT/JP2021/034995, dated Dec. 14, 2021, 16 pages.
U.S. Appl. No. 18/019,230, filed Feb. 1, 2023, Fukudome et al.
U.S. Appl. No. 18/019,060, filed Jan. 31, 2023, Kanzaki et al.
U.S. Appl. No. 18/019,066, filed Jan. 31, 2023, Kanzaki et al.
U.S. Appl. No. 18/017,825, filed Jan. 24, 2023, Hayama et al.
U.S. Appl. No. 18/017,824, filed Jan. 24, 2023, Ejima et al.
U.S. Appl. No. 18/029,063, filed Mar. 28, 2023, Higashidozono et al.
U.S. Appl. No. 18/029,065, filed Mar. 28, 2023, Higashidozono.
Official Action issued in European related Application Serial No. 21853139.0, dated Mar. 22, 2024, 15 pages.
Official Action issued in European related Application Serial No. 21852577.2, dated Mar. 22, 2024, 9 pages.
Official Action issued in European related Application Serial No. 21853892.4, dated Mar. 22, 2024, 8 pages.
Official Action issued in European related Application Serial No. 21854468.2, dated Jul. 24, 2024, 7 pages.
Official Action issued in European related Application Serial No. 91853973.2, dated Jul. 25, 2024, 7 pages.
Official Action issued in European related Application Serial No. 21853972.4, dated Jul. 24, 2024, 8 pages.
Official Action issued in European related Application Serial No. 21872539.8, dated Sep. 3, 2024, 5 pages.
Official Action issued in European related Application Serial No. 21875395.2, dated Sep. 13, 2024, 7 pages.
Search Report issued in European related Application Serial No. 21906416.9, dated Oct. 22, 2024, 8 pages.
Official Action issued in Japanese related Application Serial No. 2022-541458, dated Oct. 15, 2024, 6 pages with English Translation.
Official Action issued in Korean related Application Serial No. 10-2023-7004906, dated Jun. 17, 2024, 10 pages with English Translation.
Official Action issued in Korean related Application Serial No. 10-2023-7004905, dated Jun. 17, 2024, 10 pages with English Translation.
Official Action issued in Korean related Application Serial No. 10-2023-7011145, dated Jun. 18, 2024, 6 pages with English Translation.
Official Action issued in Korean related Application Serial No. 10-2023-7004093, dated Jun. 17, 2024, 11 pages with English Translation.
Official Action issued in Korean related Application Serial No. 10-2023-7020969, dated Jun. 21, 2024, 8 pages with English Translation.
Official Action issued in US related U.S. Appl. No. 18/019,230, dated Apr. 25, 2024, 11 pages.
Official Action issued in US related U.S. Appl. No. 18/019,066, dated Apr. 24, 2024, 6 pages.
Official Action issued in US related U.S. Appl. No. 18/029,065, dated Apr. 23, 2024, 14 pages.
Official Action issued in US related U.S. Appl. No. 18/017,825, dated Apr. 15, 2024, 15 pages.
Official Action issued in US related U.S. Appl. No. 18/017,824, dated Mar. 13, 2024, 19 pages.
Official Action issued in US related U.S. Appl. No. 18/019,060, dated Apr. 26, 2024, 6 pages.
Official Action issued in related U.S. Appl. No. 18/027,599, dated Jun. 13, 2024, 16 pages.
Official action issued in related U.S. Appl. No. 18/029,065, dated Aug. 6, 2024, 10 pages.
Official action issued in related U.S. Appl. No. 18/019,066, dated Sep. 5, 2024, 7 pages.
Official action issued in related U.S. Appl. No. 18/019,060, dated Sep. 5, 2024, 7 pages.
Official action issued in related U.S. Appl. No. 18/267,072, dated Sep. 6, 2024, 9 pages.
Official action issued in related U.S. Appl. No. 18/267,072, dated Oct. 9, 2024, 15 pages.
Official action issued in related U.S. Appl. No. 18/019,230, dated Oct. 15, 2024, 13 pages.
Notice of Allowance issued in US related U.S. Appl. No. 18/017,825, dated Aug. 8, 2024, 6 pages.
Notice of Allowance issued in US related U.S. Appl. No. 18/017,824, dated Aug. 27, 2024, 8 pages.
Notice of Allowance issued in US related U.S. Appl. No. 18/022,465, dated Apr. 25, 2024, 7 pages.

* cited by examiner

C
EXPANSION VALVE

TECHNICAL FIELD

The present invention relates to an expansion valve used in an air conditioning system.

BACKGROUND ART

An air conditioning system has a refrigeration cycle which mainly includes a compressor compressing a refrigerant to become superheated steam having a high temperature and a high pressure, a condenser cooling the refrigerant sent from the compressor to become a supercooled liquid having a high temperature and a high pressure, an expansion valve expanding the refrigerant sent from the condenser to become moist steam having a low temperature and a low pressure, and an evaporator heating the refrigerant sent from the expansion valve to become saturated steam and in which the refrigerant circulates in order of the compressor, the condenser, the expansion valve, and the evaporator.

For example, an expansion valve of Patent Citation 1 is an electronic expansion valve and is able to adjust a valve opening degree between a valve seat formed in a valve housing and a valve body by driving the valve body in a valve opening direction by an electromagnetic force of a solenoid against an urging force of an urging means. Further, a current value applied to the solenoid is set on the basis of the temperature or pressure of the refrigerant having passed through a condenser and a valve opening degree is adjusted, so that a supercooling degree of the condenser is maintained constant.

Further, it is also known to adjust the dryness of moist steam so that all refrigerants become saturated steam after the refrigerants pass through an evaporator by adjusting a valve opening degree of an expansion valve on the basis of the temperature or pressure of the refrigerant before or after passing through the evaporator.

CITATION LIST

Patent Literature

Patent Citation 1: JP 2001-153498 A (page 3, FIG. 1)

SUMMARY OF INVENTION

Technical Problem

Since the expansion valve of Patent Citation 1 has a poppet valve structure in which a valve opening portion is closed by the valve body and the valve seat, the valve opening portion can be reliably closed. However, since the refrigerant of a high-pressure primary pressure is supplied from the condenser to the valve opening portion, a force due to the pressure of the refrigerant is applied to the valve body in addition to a driving force of the solenoid in the valve opening direction. As a result, there is concern that the valve opening degree with respect to the current value applied to the solenoid is slightly different depending on the pressure of the refrigerant.

The present invention has been made by focusing on such a problem and an object of the present invention is to provide an expansion valve having a high valve opening adjustment accuracy.

Solution to Problem

In order to solve the foregoing problem, an expansion valve according to the present invention includes: a valve housing which is provided with an inlet port allowing a refrigerant from a condenser to pass therethrough and an outlet port allowing a refrigerant toward an evaporator to pass therethrough; a valve body which is driven by a solenoid; a valve seat on which the valve body sits; and an urging member configured to urge the valve body in a valve closing direction, wherein a space is formed on a valve opening direction side of the valve body, and the refrigerant on the valve closing direction side in relation to the valve body flows into the space. According to the aforesaid feature of the present invention, since the refrigerant on the valve closing direction side in relation to the valve seat flows into the space on the valve opening direction side of the valve body, the influence on the operation of the valve body due to a differential pressure between the high-pressure primary pressure sent to the expansion valve and a low-pressure secondary pressure on the evaporator side during the operation of the air conditioning system is small. Further, since the valve body strokes accurately with respect to the current value, the valve opening adjustment accuracy by the valve body is high.

It may be preferable that the urging member is disposed in the space. According to this preferable configuration, since the urging member can be disposed by using the space into which the refrigerant flows, it is possible to compactly form the expansion valve.

It may be preferable that the outlet port is provided on the valve closing direction side in relation to the valve seat and a communication path is provided to communicate the space with the outlet port. According to this preferable configuration, the refrigerant of the secondary pressure on the evaporator side can flow from the outlet port formed in the valve housing into the space through the communication path.

It may be preferable that the communication path is formed in the valve body. According to this preferable configuration, since the communication path is formed in the valve body, it is possible to simply perform a processing operation compared to a case in which the communication path is formed in the valve housing.

It may be preferable that the space and the inlet port are partitioned by a bellows. According to this preferable configuration, it is possible to partition the space and the inlet port by a simple configuration.

It may be preferable that an effective pressure receiving area of the valve body is equal to an effective pressure receiving area of the bellows. According to this preferable configuration, since the pressure of the refrigerant applied to the valve body from both sides in the solenoid driving direction is canceled, the operation of the solenoid is not influenced by the pressure of the refrigerant. Therefore, it is possible to finely change the flow rate of the refrigerant sent to the evaporator by the valve opening degree adjusted by the balance with the electromagnetic force of the solenoid and the urging force of the urging member.

DESCRIPTION OF EMBODIMENTS

Modes for carrying out an expansion valve according to the present invention will be described below with reference to embodiments.

First Embodiment

An expansion valve according to a first embodiment of the present invention will be described with reference to FIGS. 1 to 4. Hereinafter, the left and right sides when viewed from the front side of FIG. 2 will be described as the left and right sides of the expansion valve. Specifically, the left side of the paper surface in which a valve housing 10 of FIG. 2 is disposed will be described as the left side of the expansion valve and the right side of the paper surface in which a solenoid 80 is disposed will be described as the right side of the expansion valve.

Figure 1:
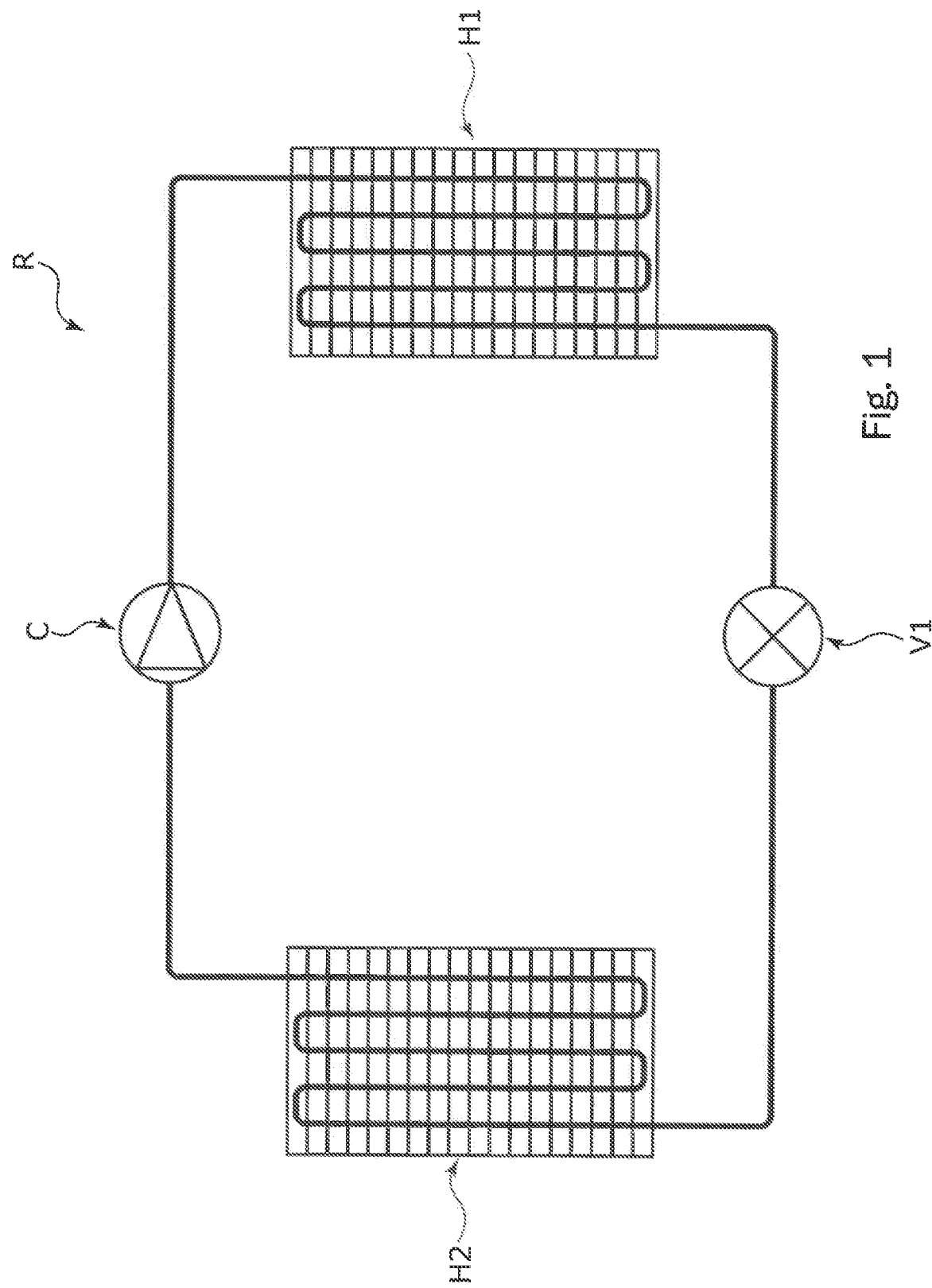
FIG. 1 is a schematic diagram showing a refrigeration cycle that adopts an expansion valve according to a first embodiment of the present invention.
Figure 2:
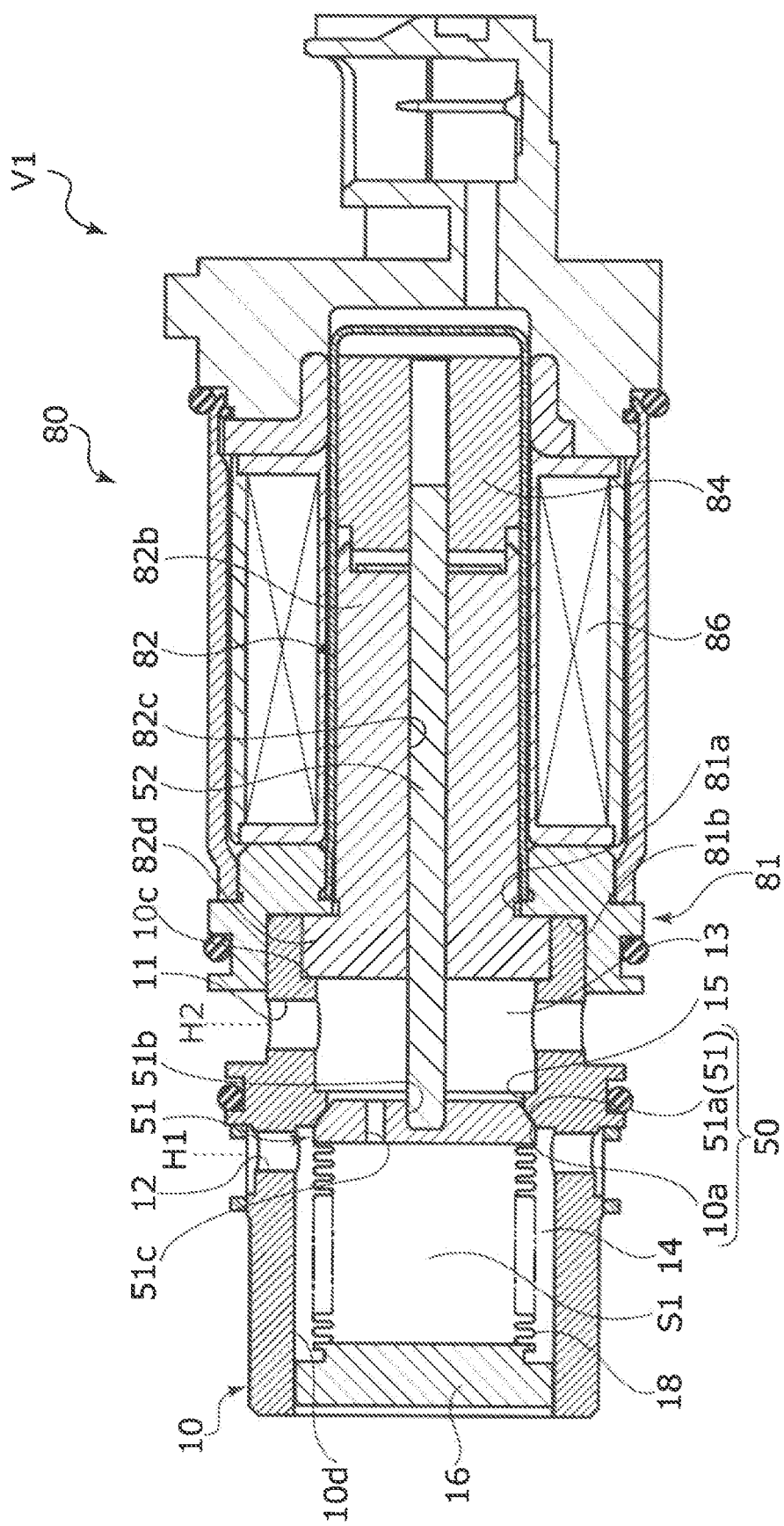
FIG. 2 is a cross-sectional view showing a structure of the expansion valve according to the first embodiment.

As shown in FIG. 1, an expansion valve V1 according to the first embodiment of the present invention constitutes a refrigeration cycle R used in an air conditioning system of an automobile or the like together with a compressor C, an indoor heat exchanger H1, an outdoor heat exchanger H2, and the like.

First, the refrigeration cycle R will be described. The refrigeration cycle R is configured to circulate the refrigerant in order of the compressor C, the heat exchanger H1, the expansion valve V1, and the heat exchanger H2 in a heating mode. The refrigerant becomes superheated steam having a high pressure and a high temperature by the compressor C, becomes a supercooled liquid having a high temperature and a high pressure by the heat exchange with indoor air using the heat exchanger H1, becomes moist steam having a low temperature and a low pressure by being depressurized from a high-pressure primary pressure to a low-pressure secondary pressure using the expansion valve V1, and becomes saturated steam by the heat exchange with outdoor air using the heat exchanger H2. Accordingly, the indoor air is heated by the heat exchange with the heat exchanger H1. That is, in the heating mode, the heat exchanger H1 serves as a condenser and the heat exchanger H2 serves as an evaporator.

Further, the refrigeration cycle R is configured to circulate the refrigerant in order of the compressor C, the heat exchanger H2, the expansion valve V1, and the heat exchanger H1 in a cooling mode. The refrigerant becomes superheated steam having a high temperature and a high pressure by the compressor C, becomes a supercooled liquid having a high temperature and a high pressure by the heat exchange with outdoor air using the heat exchanger H2, becomes moist steam having a low temperature and a low pressure by being depressurized from a high-pressure primary pressure to a low-pressure secondary pressure using the expansion valve V1, and becomes saturated steam by the heat exchange with indoor air using the heat exchanger H1. Accordingly, the indoor air is cooled by the heat exchange with the heat exchanger H1. That is, in the cooling mode, the heat exchanger H1 serves as an evaporator and the heat exchanger H2 serves as a condenser.

In addition, in the following description, the refrigeration cycle R is used for heating unless otherwise specified. Similarly, the heat exchanger H1 is referred to as a condenser H1 and the heat exchanger H2 is referred to as an evaporator H2 on the basis of the heating mode.

As shown in FIGS. 1 and 2, the expansion valve V1 is disposed between the condenser H1 and the evaporator H2. A current flowing through a coil 86 constituting the solenoid 80 is set on the basis of the temperature difference of the refrigerants at the inlet side and the outlet side of the evaporator H2. When the valve opening degree of the expansion valve V1 is adjusted in accordance with this current, the pressure of the refrigerant having passed through a valve 50 is adjusted from a high-pressure primary pressure P1 to a relatively low-pressure secondary pressure P2 and the temperature of the refrigerant is also adjusted from a high temperature to a low temperature. Accordingly, all refrigerants which are supercooled liquids sent from the condenser H1 are adjusted to the dryness of the moist steam that can transition to the saturated steam after passing through the evaporator H2.

In this embodiment, the valve 50 includes a valve body 51 and a valve seat 10a formed on the inner peripheral surface of the valve housing 10 and when a tapered surface portion 51a formed at the axial right end portion of the valve body 51 comes into contact with and separates from the valve seat 10a, the valve 50 is opened and closed.

Next, the structure of the expansion valve V1 will be described. As shown in FIG. 2, the expansion valve V1 mainly includes the valve housing 10 which is formed of a metal material or a resin material, the valve body 51 which is disposed inside the valve housing 10, and the solenoid 80 which is connected to the valve housing 10 and applies a driving force to the valve body 51.

Figure 3:
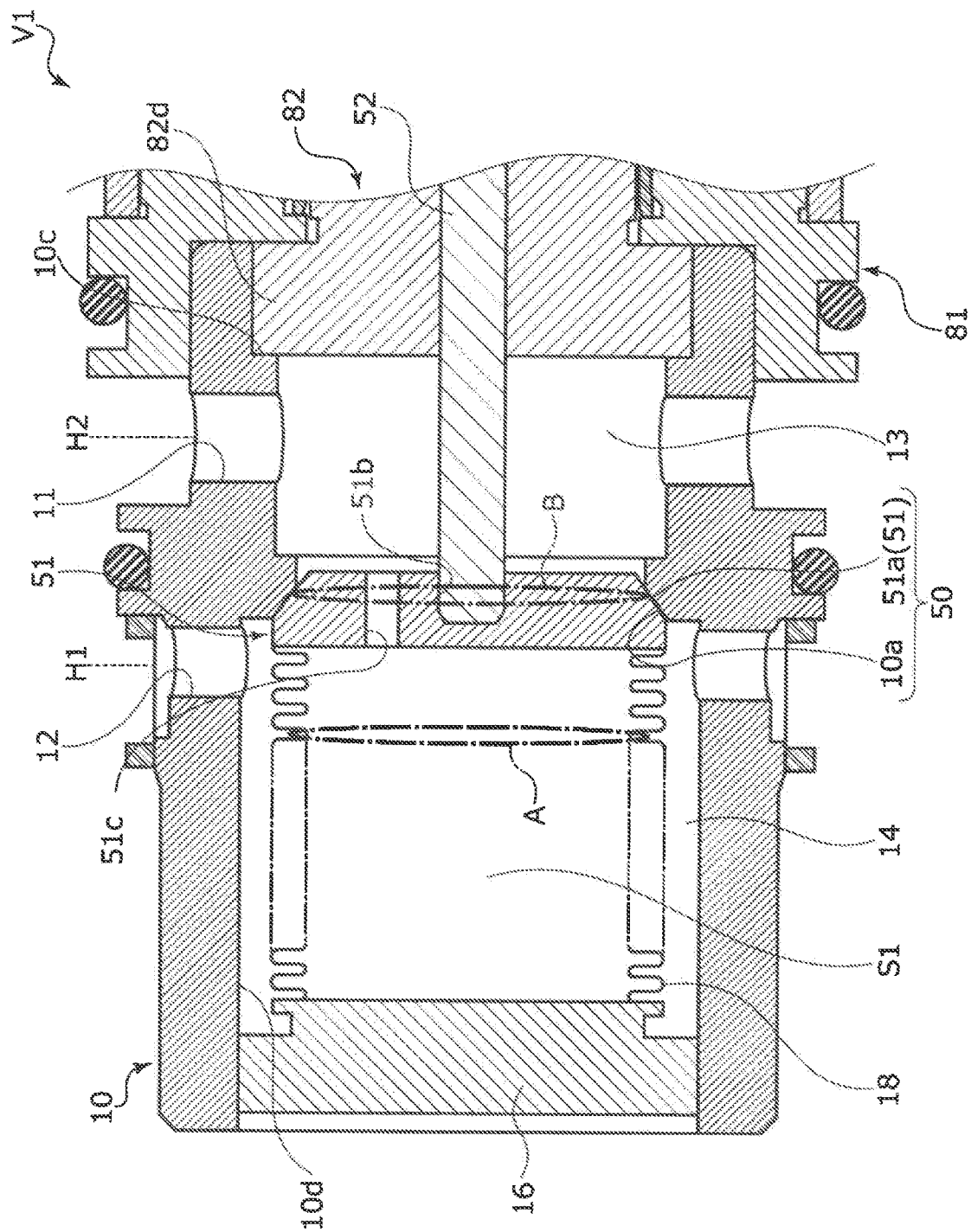
FIG. 3 is a cross-sectional view showing a state in which the expansion valve according to the first embodiment is closed.
Figure 4:
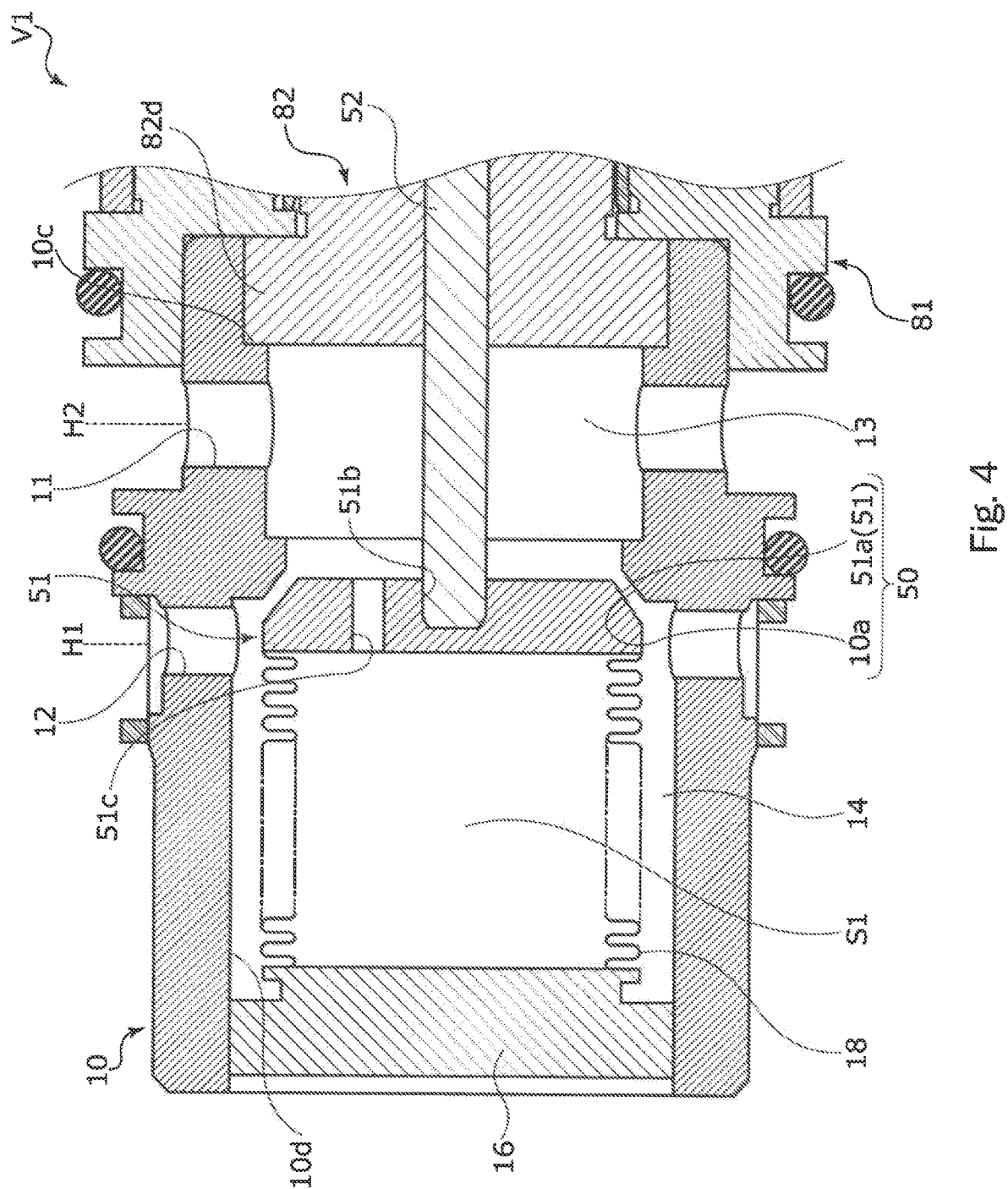
FIG. 4 is a cross-sectional view showing a state in which the expansion valve according to the first embodiment is opened.

As shown in FIGS. 2 to 4, the valve body 51 includes a concave portion 51b which is formed at the center portion to open toward the axial right side and an axial left end portion of a rod 52 disposed to penetrate the coil 86 of the solenoid 80 is press-fitted and fixed to the concave portion 51b. Further, a communication path 51c is formed in the valve body 51 at a position deviating in the radial direction in relation to the concave portion 51b to penetrate in the axial direction. The communication path 51c is formed to have a constant cross-section. In addition, a plurality of the communication paths 51c may be provided. This case is preferable in that the refrigerant can be easily allowed to enter and exit.

As shown in FIGS. 2 to 4, the valve housing 10 is provided with an outlet port 11 which communicates with the evaporator H2 and an inlet port 12 which communicates with the condenser H1. The outlet port 11 is formed on the axial right side in relation to the valve seat 10a, that is, the valve closing direction to be described later. Further, the inlet port 12 is formed on the axial left side in relation to the valve seat 10a, that is, the valve opening direction to be described later.

A primary pressure chamber 14, a secondary pressure chamber 13, a valve opening portion 15, and a concave portion 10d are provided inside the valve housing 10. The refrigerant having passed through the condenser H1 is supplied from the inlet port 12 to the primary pressure chamber 14. The refrigerant having passed through the valve 50 is supplied from the primary pressure chamber 14 to the secondary pressure chamber 13 and is output from the outlet port 11. Further, the outlet port 11 communicates with the secondary pressure chamber 13. The valve opening portion 15 is disposed between the secondary pressure chamber 13 and the primary pressure chamber 14 and the valve seat 10a is formed at the edge portion on the axial left side. The concave portion 10d is disposed on the axial left side in relation to the valve seat 10a and constitutes the primary pressure chamber 14.

In the concave portion 10d, an opening portion on the axial left side is closed by a lid member 16. Further, a bellows 18 which is an urging member configured to urge the valve body 51 toward the axial right side, that is, in the valve closing direction is disposed in the primary pressure chamber 14. In the bellows 18, the axial left end is hermetically fixed to the lid member 16 and the axial right end is hermetically fixed to the axial left end surface of the valve body 51. That is, a space S1 is formed by partitioning the inside of the valve housing 10 using the bellows 18, the lid member 16, and the valve body 51.

Further, the space S1 communicates with the secondary pressure chamber 13 through the communication path 51c and the refrigerant inside the secondary pressure chamber 13 flows into the space S1. That is, the bellows 18 substantially hermetically partitions the space S1 and the primary pressure chamber 14 in the closed state of the valve 50.

Further, a flange portion 82d of a center post 82 is inserted and fitted from the axial right side into a concave portion 10c which is formed at the axial right end of the valve housing 10 and recessed toward the axial left side and the center post 82 is integrally and substantially hermetically connected and fixed to the valve housing 10. In addition, a through-hole is formed on the bottom of the concave portion 10c of the valve housing 10 and the concave portion 10c can be called an annular step portion.

As shown in FIG. 2, the solenoid 80 mainly includes a casing 81 which includes an opening portion 81a opening toward the axial left side, the center post 82 which is inserted from the axial left side into the opening portion 81a of the casing 81, is fixed to the inner diameter side of the casing 81, and has a substantially cylindrical shape, the rod 52 which is inserted through the center post 82 and is disposed to be movable in a reciprocating manner in the axial direction, the valve body 51 which is press-inserted and fixed to the axial left end portion of the rod 52, a movable iron core 84 into which the axial right end portion of the rod 52 is inserted and fixed, and an excitation coil 86 which is wound on the outside of the center post 82 through a bobbin.

The axial right end portion of the valve housing 10 is substantially hermetically inserted and fixed to a concave portion 81b which is formed at the axial left end of the casing 81 and is recessed toward the axial right side.

The center post 82 includes a cylindrical portion 82b which is formed of a rigid body corresponding to a magnetic material such as iron or silicon steel, extends in the axial direction, and is provided with a through-hole 82c through which the rod 52 is inserted and the flange portion 82d which extends from the outer peripheral surface of the axial left end portion of the cylindrical portion 82b in the outer diameter direction and has an annular shape.

Further, the valve housing 10 is substantially hermetically inserted and fixed to the concave portion 81b of the casing 81 while the axial right end surface of the flange portion 82d of the center post 82 comes into contact with the bottom surface of the concave portion 81b of the casing 81 from the axial left side. That is, the center post 82 is fixed by sandwiching the flange portion 82d between the bottom surface of the concave portion 81b of the casing 81 and the bottom surface of the concave portion 10c of the valve housing 10 from both sides in the axial direction.

Next, the opening and closing operation of the expansion valve V1 will be described.

First, a state in which the expansion valve V1 is not energized will be described. As shown in FIGS. 2 and 3, when the valve body 51 is pressed toward the axial right side, that is, in the valve closing direction by the urging force of the bellows 18 in a state in which the expansion valve V1 is not energized, the tapered surface portion 51a of the valve body 51 sits on the valve seat 10a to close the valve 50. Specifically, the tapered surface portion 51a of the valve body 51 comes into contact with the valve seat 10a formed in a tapered shape to expand toward the axial left side so that the tapered surface portion sits thereon.

At this time, when the effective pressure receiving area of the bellows 18 is A and the effective pressure receiving area of the valve body 51 is B, the urging force $F_{bel}$ of the bellows 18, the force $F_{P1}=P1\times(A-B)$ due to the primary pressure P1 of the refrigerant, and the force $F_{P2}=-(P2\times(A-B))$ due to the secondary pressure P2 of the refrigerant are applied to the valve body 51 with the axial right direction as positive. That is, the force $F_{rod}=F_{bel}+F_{P1}-F_{P2}$ is applied to the valve body 51 with the right direction as positive.

Specifically, the refrigerant inside the space S1 is applied to the axial left end surface of the valve body 51 and the refrigerant inside the secondary pressure chamber 13 is applied to the axial right end surface of the valve body 51. Since the secondary pressure chamber 13 and the space S1 communicate with each other by the communication path 51c formed in the valve body 51, the refrigerant inside the secondary pressure chamber 13 on the valve closing direction side in relation to the valve body 51, that is, the refrigerant of the secondary pressure P2 supplied from the outlet port 11 to the evaporator H2 flows into the space S1.

Further, the axial left end surface of the valve body 51 is formed to be slightly larger than the axial right end surface. Accordingly, it is easy to maintain the valve 50 in a closed state even when a slight pressure difference is instantly generated between the pressure inside the space S1 and the pressure inside the secondary pressure chamber 13.

Further, since the communication path 51c is a narrow through-hole, in other words, a through-hole having a narrow passage cross-sectional area, the refrigerant inside the space S1 does not easily and instantly move toward the secondary pressure chamber 13, is held inside the space S1, and easily maintains the valve 50 in a closed state when a slight pressure difference is instantly generated between the pressure inside the space S1 and the pressure inside the secondary pressure chamber 13.

In this way, the refrigerant flowing into the space S1 and the secondary pressure chamber 13 is the refrigerant of the same secondary pressure P2 supplied from the outlet port 11 to the evaporator H2. Further, since the effective pressure receiving area A of the bellows 18 is the same as the effective pressure receiving area B of the valve body 51 (i.e., A=B), the forces $F_{P1}$ and $F_{P2}$ applied to the valve body 51 due to the pressures P1 and P2 of the refrigerant are almost zero. That is, the force $F_{rod} = F_{bel}$ is substantially applied to the valve body 51 with the right direction as positive.

Next, a state in which the expansion valve V1 is energized will be described. As shown in FIGS. 2 and 4, when an electromagnetic force $F_{sol}$ generated by applying a current to the solenoid 80 exceeds the force $F_{rod}$ (i.e., $F_{sol} > F_{rod}$) in the energized state of the expansion valve V1, that is, during normal control which is so-called duty control, the movable iron core 84 is pulled toward the center post 82 side, that is, the axial left side, both the valve body 51 and the rod 52 fixed to the movable iron core 84 move toward the axial left side, that is, in the valve opening direction, and the tapered surface portion 51a of the valve body 51 is separated from the valve seat 10a of the valve housing 10. In this way, the valve 50 is opened. Further, since the movable iron core 84 comes into contact with the axial right side of the center post 82 when driving the solenoid 80, the valve body 51 is further regulated from being separated from the valve seat 10a.

At this time, the electromagnetic force $F_{sol}$ is applied to the valve body 51 toward the axial left side and the force $F_{rod}$ is applied thereto toward the axial right side. That is, the force $F_{rod} - F_{sol}$ is applied to the valve body 51 with the right direction as positive.

In this way, the valve opening degree of the expansion valve V1 is adjusted by the balance with the electromagnetic force of the solenoid 80 and the urging force of the bellows 18. Accordingly, the refrigerant supplied from the inlet port 12 and passing through the condenser H1 is depressurized from the high-pressure primary pressure P1 to the low-pressure secondary pressure P2 and is supplied to the evaporator H2 through the outlet port 11.

As described above, since the space S1 is formed on the driving direction side of the solenoid 80 in relation to the valve body 51, that is, the valve opening direction side of the valve body 51 and the refrigerant of the secondary pressure chamber 13 having a pressure lower than that of the refrigerant of the primary pressure chamber 14 flows into the space S1, it is possible to reduce the influence of the differential pressure applied to both sides in the moving direction of the valve body 51 when the valve 50 is switched from the closed state to the open state. As a result, since the valve body 51 accurately strokes with respect to the current value applied to the solenoid 80, it is possible to accurately adjust the valve opening degree by the valve body 51. Particularly, since the expansion valve V1 is configured as a normal closed type in which the valve body 51 is urged in the valve closing direction of the valve 50 by the bellows 18, it is possible to open the valve 50 by instantly operating the valve body 51 and to promptly reduce the high-pressure primary pressure P1 to the low-pressure secondary pressure P2.

Further, since the bellows 18 is disposed in the space S1, it is not necessary to ensure a space for disposing the urging member on the side of the solenoid 80 and to configure the expansion valve V1 in a compact size. Further, since the bellows 18 is disposed on the side opposite to the solenoid 80 in the valve body 51, it is possible to stabilize the operation of the valve body 51.

Further, the valve body 51 is provided with the communication path 51c which communicates the space S1 with the outlet port 11 and the refrigerant of the secondary pressure P2 flows from the outlet port 11 formed in the valve housing 10 into the space S1 through the communication path 51c. Accordingly, for example, a port separated from the outlet port 11 does not need to be formed in the valve housing 10 or the lid member 16 and the structure of the expansion valve V1 can be simplified.

Further, since the communication path 51c is formed to penetrate the valve body 51 in the axial direction, the communication path communicating the space S1 with the outlet port 11 can be simply processed compared to the case of forming the communication path in the valve housing 10.

Further, since the space S1 and the inlet port 12 are substantially hermetically partitioned by the bellows 18, it is possible to prevent the refrigerant of the primary pressure P1 from flowing into the space S1 in the closed state of the valve 50. In other words, since it is possible to maintain the secondary pressure P2 inside the space S1 in the closed state of the valve 50, it is possible to reliably reduce the influence of the differential pressure applied to both sides in the moving direction of the valve body 51 when the valve 50 is switched from the closed state to the open state. Further, since the bellows 18 which partitions the space S1 and the inlet port 12 also functions as the urging member, it is possible to simply configure the expansion valve V1.

In addition, in the first embodiment, an example has been described in which the effective pressure receiving area A of the bellows 18 is the same as the effective pressure receiving area B of the valve body 51 (A=B). However, the effective pressure receiving area A may be slightly larger than the effective pressure receiving area B (i.e., A>B), the closed state of the valve 50 may be reliably maintained, the effective pressure receiving area B may be slightly larger than the effective pressure receiving area A (i.e., A<B), and the valve 50 may be easily opened. That is, the influence due to the pressure of the refrigerant applied to both sides in the moving direction of the valve body 51 may be reduced.

Further, in the first embodiment, an example has been described in which the bellows 18 also has a function of partitioning the space S1 and the primary pressure chamber 14 and a function as the urging member, but when the urging member for urging the valve body 51 in the valve closing direction is provided separately, the bellows 18 does not have the urging force.

Second Embodiment

An expansion valve according to a second embodiment of the present invention will be described with reference to FIGS. 5 to 7. In addition, the description of the overlapping configuration in the same configuration as that of the first embodiment will be omitted.

Figure 5:
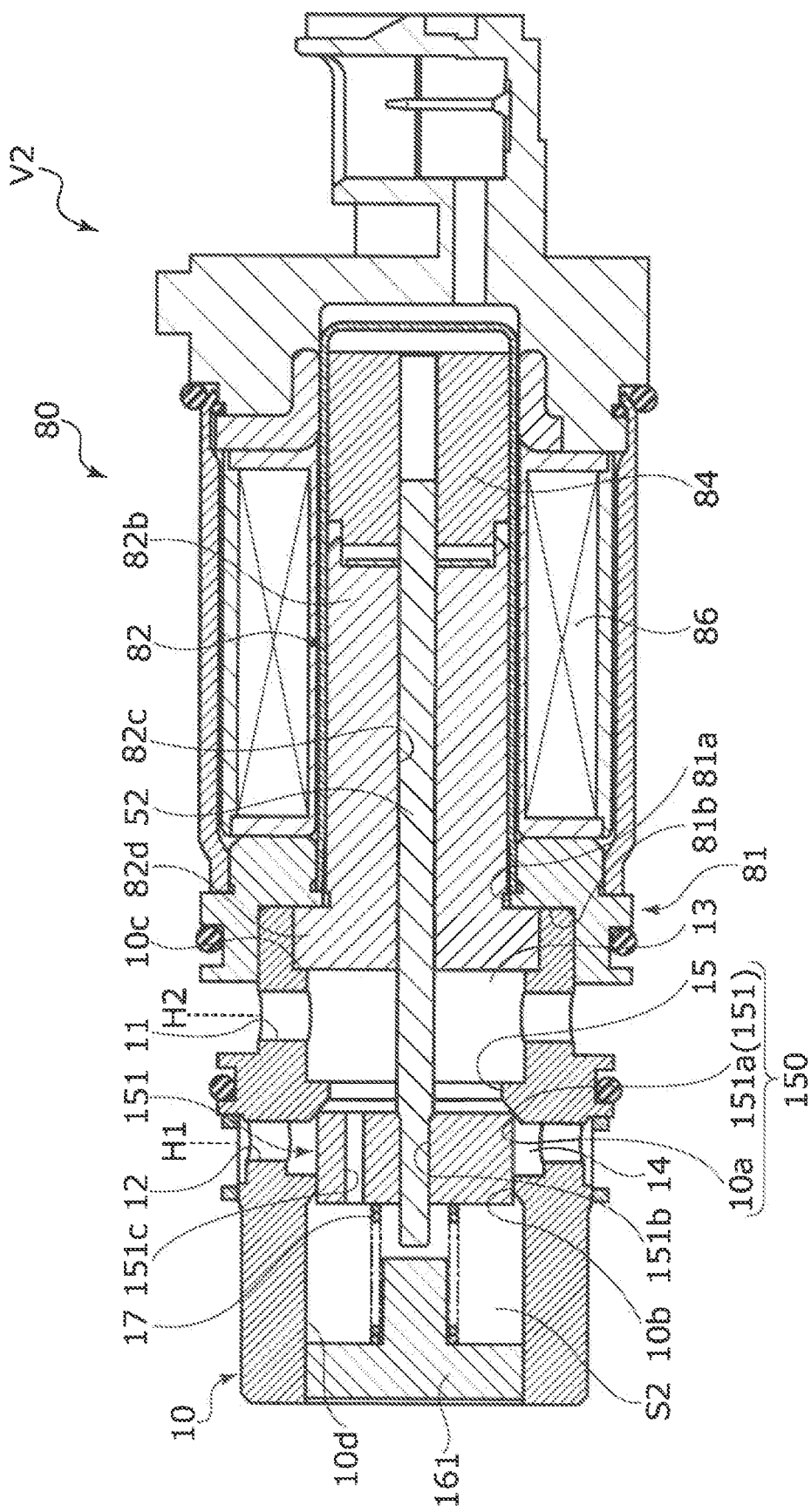
FIG. 5 is a cross-sectional view showing a structure of an expansion valve according to a second embodiment of the present invention.
Figure 6:
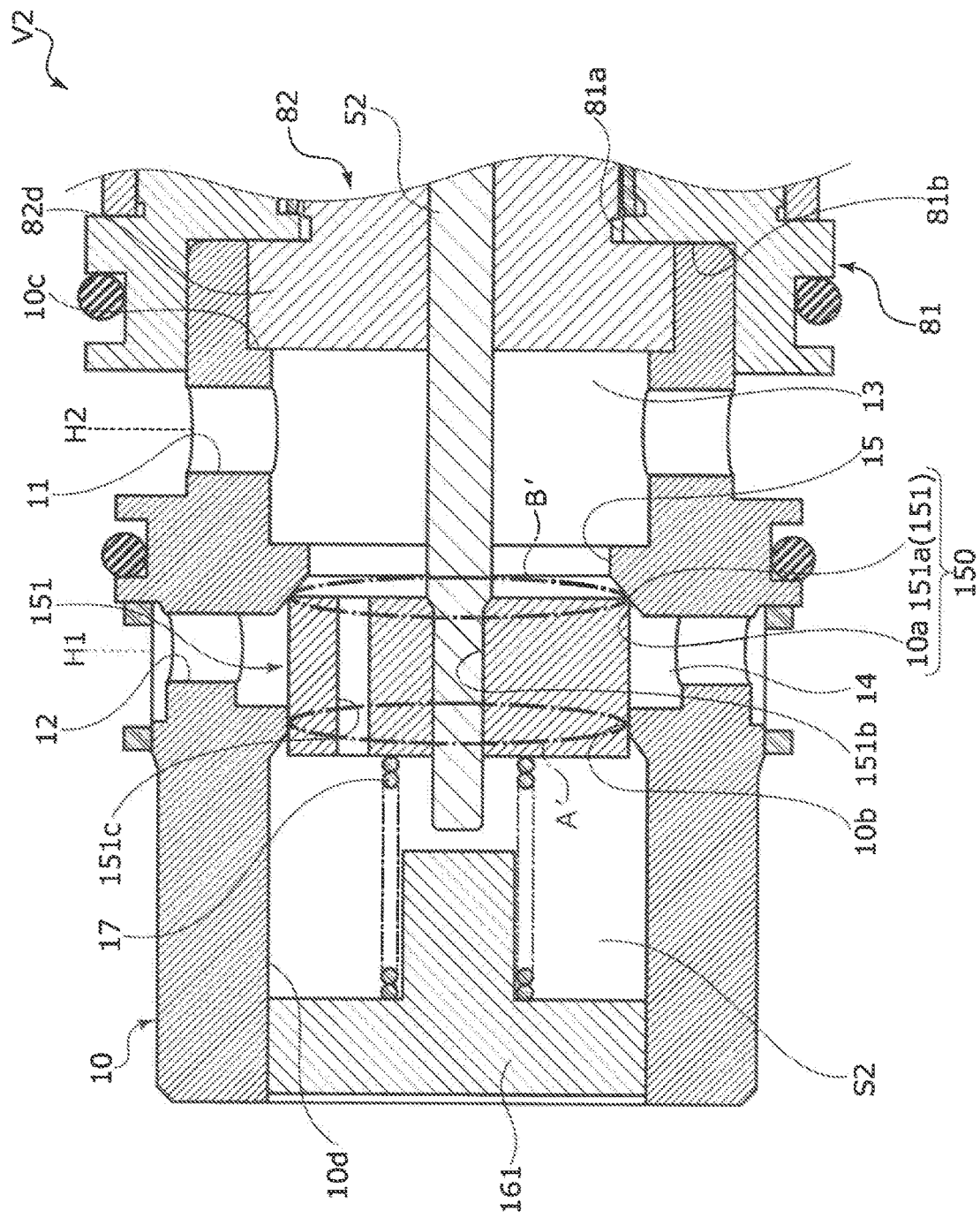
FIG. 6 is a cross-sectional view showing a state in which the expansion valve according to the second embodiment is closed.
Figure 7:
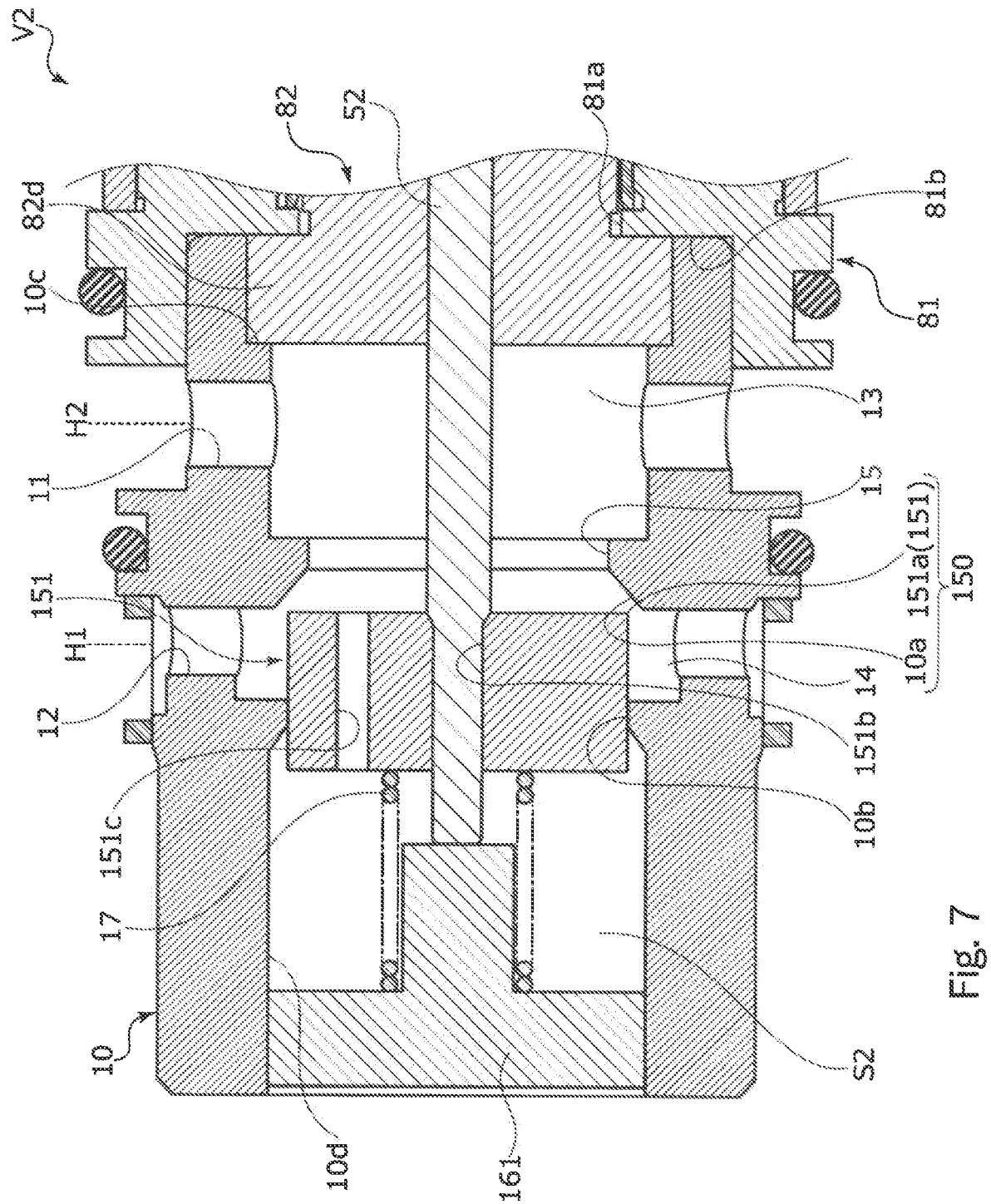
FIG. 7 is a cross-sectional view showing a state in which the expansion valve according to the second embodiment is opened.

As shown in FIGS. 5 and 6, in an expansion valve V2 according to the second embodiment, a valve body 151 of a valve 150 is a tubular body having a through-hole 151b penetrating its center portion and an edge portion of an axial right end 151a sits on the valve seat 10a. The axial left end portion of the rod 52 is press-inserted and fixed while penetrating the through-hole 151b.

The axial left end surface and the axial right end surface of the valve body 151 are formed to have the same diameter. In other words, the effective pressure receiving area A' of the valve body 151 to which the refrigerant of a space S2 to be described later is applied is the same as the effective pressure receiving area B' of the valve body 151 to which the refrigerant inside the secondary pressure chamber 13 is applied (i.e., A'=B').

The space S2 which is partitioned by the concave portion 10d, a lid member 161, and the valve body 151 is formed inside the valve housing 10. Further, the valve housing 10 is provided with an annular portion formed between the concave portion 10d and the inlet port 12 and extending toward the inner diameter side. The inner peripheral surface of the annular portion functions as a guide surface 10b on which the outer peripheral surface of the valve body 151 is substantially hermetically slidable.

A minute gap is formed between the guide surface 10b and the outer peripheral surface of the valve body 151 due to the slight radial separation thereof, the valve body 151 is smoothly and relatively movable in the axial direction with respect to the valve housing 10, and the gap functions as a clearance seal which substantially hermetically partitions the space S2 and the primary pressure chamber 14.

The secondary pressure chamber 13 and the space S2 communicate with each other by a communication path 151c formed in the valve body 151. That is, the refrigerant inside the secondary pressure chamber 13 flows into the space S2 through the communication path 151c. Further, a spring 17 which is an urging member for urging the valve body 151 toward the axial right side is disposed in the space S2.

Next, the opening and closing operation of the expansion valve V2 will be described.

First, a state in which the expansion valve V2 is not energized will be described. As shown in FIGS. 5 and 6, when the valve body 151 is pressed toward the axial right side by the urging force of the spring 17 in a state in which the expansion valve V2 is not energized, the axial right end 151a of the valve body 151 sits on the valve seat 10a and the valve 150 is closed.

At this time, in the valve body 151, the urging force $F_{sp}$ of the spring 17 and the pressure $F_{P1}$ of the refrigerant with respect to the axial left end surface of the valve body 151 are applied toward the axial right side and the pressure ($F_{P2}$) of the refrigerant with respect to the axial right side surface of the valve body 151 is applied toward the axial left side. That is, the force $F_{rod}=F_{sp}+F_{P1}-F_{P2}$ is applied to the valve body 151 with the right direction as positive.

Specifically, since the effective pressure receiving areas A' and B' of the valve body 151 are the same (i.e., A'=B'), the forces $F_{P1}$ and $F_{P2}$ applied to the valve body 151 by the pressures P1 and P2 of the refrigerant are almost zero. That is, the force $F_{rod}=F_{sp}$ is substantially applied to the valve body 151 with the right direction as positive.

Next, a state in which the expansion valve V2 is energized will be described. As shown in FIGS. 5 and 7, when an electromagnetic force $F_{sol}$ generated by applying a current to the solenoid 80 exceeds the force $F_{rod}$ (i.e., $F_{sol}>F_{rod}$) in the energized state of the expansion valve V2, that is, during normal control which is so-called duty control, the movable iron core 84 is pulled toward the center post 82 side, that is, the axial left side, both the valve body 151 and the rod 52 fixed to the movable iron core 84 move toward the axial left side, and the axial right end 151a of the valve body 151 is separated from the valve seat 10a of the valve housing 10. In this way, the valve 150 is opened. Further, since the movable iron core 84 comes into contact with the axial right side of the center post 82 at the time of driving the solenoid 80, the valve body 151 is further regulated from being separated from the valve seat 10a. In addition, the movement of the valve body 151 may be regulated by allowing the axial left end of the rod 52 to contact a shaft portion protruding from the lid member 16 toward the right side.

In this way, since the refrigerant of the secondary pressure chamber 13 on the valve closing direction side in relation to the valve body 151 flows into the space S2 formed on the valve opening direction side of the valve body 151, the differential pressure on both sides in the moving direction of the valve body 151 is small and the valve opening degree can be adjusted with high accuracy by the valve body 151.

Further, since the guide surface 10b guiding the movement of the valve body 151 is formed in the valve housing 10 and the space S2 and the inlet port 12 are substantially hermetically partitioned by the clearance seal formed between the guide surface 10b and the outer peripheral surface of the valve body 151, it is possible to suppress the refrigerant of the primary pressure P1 from flowing into the space S2 in the closed state of the valve 150. In other words, since it is easy to hold the refrigerant of the secondary pressure P2 inside the space S2, it is possible to reliably reduce the differential pressure applied to the valve body 151 when the valve 150 is switched from the closed state to the open state.

Further, since the space S2 and the inlet port 12 are substantially hermetically partitioned by the clearance seal formed between the guide surface 10b and the outer peripheral surface of the valve body 151, it is not necessary to separately provide a member for partitioning the space S2 and the inlet port 12 and it is possible to decrease the number of parts and to simplify the structure of the expansion valve V2.

Further, since the valve housing 10 is provided with the guide surface 10b through which the valve body 151 is inserted, the valve body 151 is guided to the guide surface 10b. Accordingly, it is possible to improve the operation accuracy of the valve body 151. Further, since the valve seat 10a and the guide surface 10b are integrally formed in the valve housing 10, it is possible to provide the expansion valve V2 that has a small number of parts and is miniaturized.

Further, since the effective pressure receiving areas A' and B' of the valve body 151 are the same, the pressure $F_{P1}$ of the refrigerant and the pressure $F_{P2}$ of the refrigerant are canceled. That is, since the secondary pressure P2 applied to the valve body 151 from both sides in the driving direction of the solenoid 80 is canceled, the operation of the solenoid 80 is not influenced by the secondary pressure P2. The valve opening degree is adjusted by the balance with the electromagnetic force $F_{sol}$ of the solenoid 80 and the urging force $F_{sp}$ of the spring 17. Therefore, it is possible to finely change the flow rate of the refrigerant sent to the evaporator H2.

Third Embodiment

An expansion valve according to a third embodiment of the present invention will be described with reference to FIG. 8. In addition, the description of the overlapping configuration in the same configuration as that of the first embodiment will be omitted.

Figure 8:
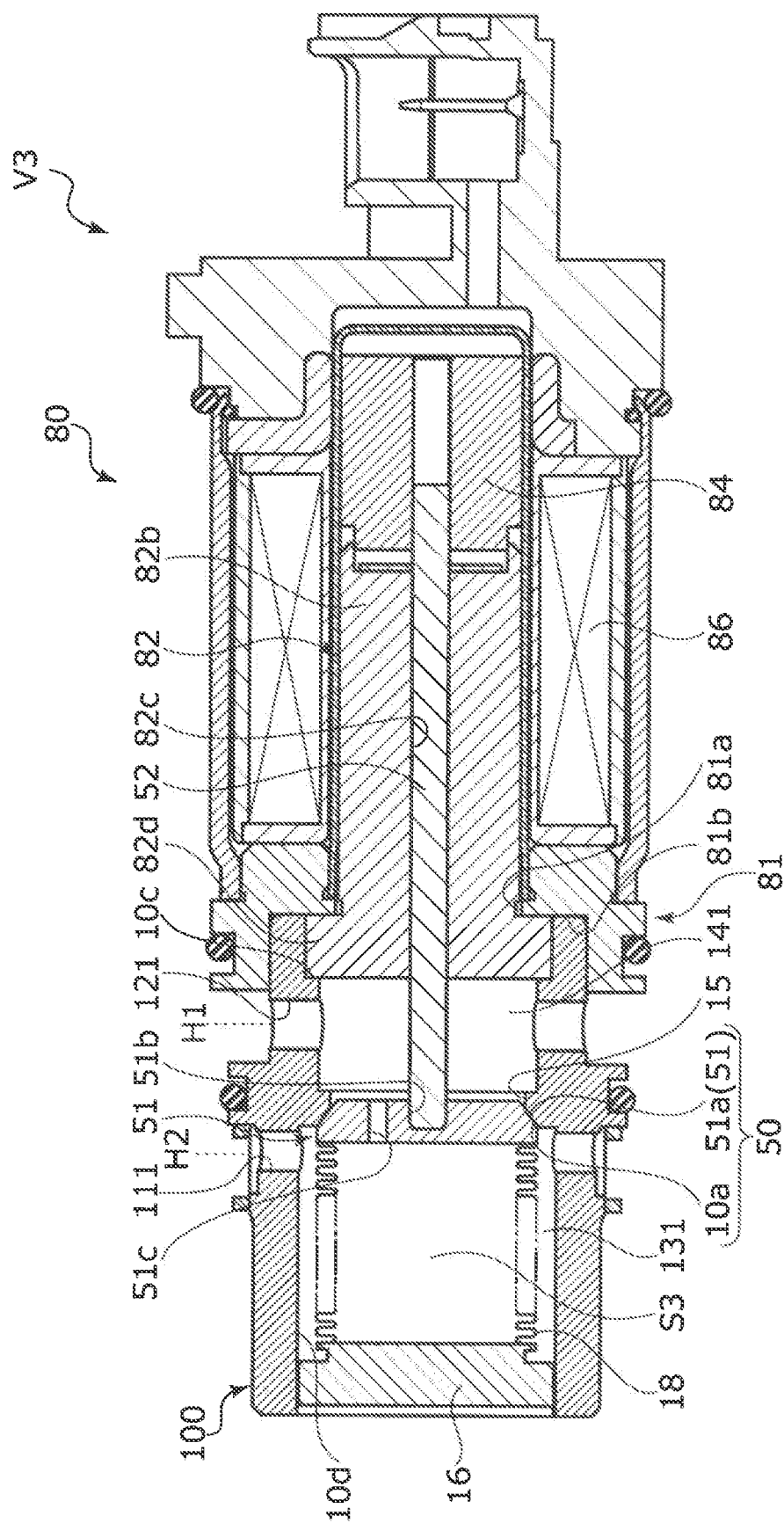
FIG. 8 is a cross-sectional view showing a structure of an expansion valve according to a third embodiment of the present invention.

As shown in FIG. 8, in a valve housing 100 in the third embodiment, an outlet port 111 is formed on the axial left side in relation to the valve seat 10a and an inlet port 121 is formed on the axial right side in relation to the valve seat 10a.

In a state in which an expansion valve V3 is not energized, that is, the valve is closed, the refrigerant of the primary pressure P1 having passed through the condenser H1 flows into a primary pressure chamber 141 communicating with the inlet port 121 and the refrigerant of the primary pressure chamber 141 flows into a space S3 through the communication path 51c.

In this way, since the refrigerant of the primary pressure chamber 141 on the valve closing direction side in relation to the valve body 151 flows into the space S3 formed on the valve opening direction side of the valve body 51, it is possible to reduce the differential pressure on both sides in the moving direction of the valve body 51 and to adjust the valve opening degree with high accuracy by the valve body 51.

Fourth Embodiment

An expansion valve according to a fourth embodiment of the present invention will be described with reference to FIG. 9. In addition, the description of the overlapping configuration in the same configuration as that of the first embodiment will be omitted.

Figure 9:
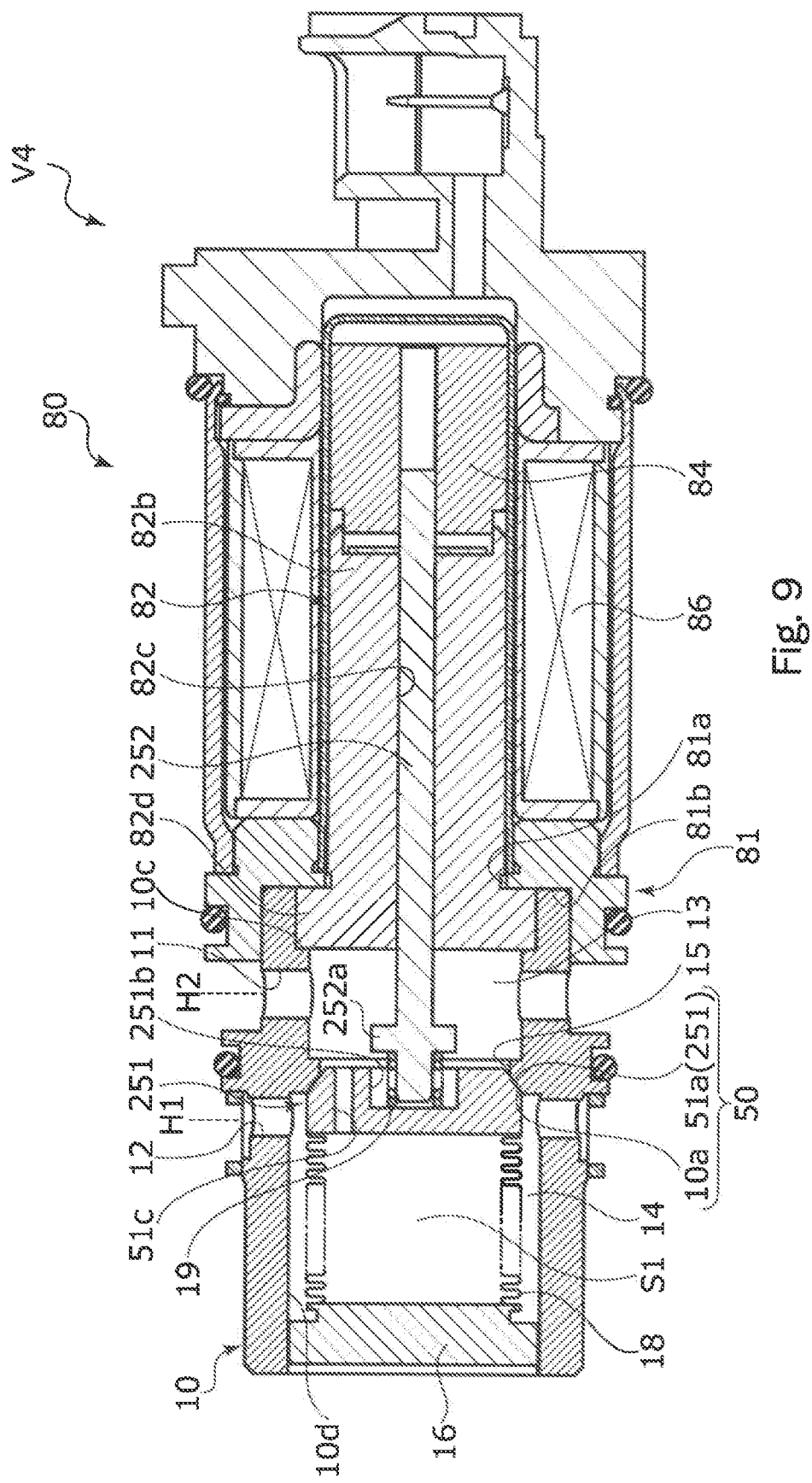
FIG. 9 is a cross-sectional view showing a structure of an expansion valve according to a fourth embodiment of the present invention.

As shown in FIG. 9, a valve body 251 in the fourth embodiment includes a concave portion 251b which is formed at the center portion to open toward the axial right side and a spring 19 which urges a rod 252, disposed to penetrate the coil 86 of the solenoid 80, toward the axial right side is disposed in the concave portion 251b. In the spring 19, the axial left end comes into contact with the bottom surface of the concave portion 251b and the axial right end comes into contact with the side surface on the axial left side of a flange portion 252a extending in the outer diameter direction from the outer peripheral surface of the axial left end portion of the rod 252.

In a state in which an expansion valve V4 is not energized, that is, the valve is closed, the bottom surface of the concave portion 251b and the axial left end of the rod 252 are supported by the spring 19 while being separated from each other in the axial direction.

Further, when the electromagnetic force $F_{sol}$ generated by applying the current to the solenoid 80 exceeds the urging force $F_{sp2}$ of the spring 19 in the energized state of the expansion valve V4 (i.e., $F_{sol} > F_{sp2}$), the movable iron core 84 is pulled toward the center post 82 side, that is, the axial left side, the rod 252 fixed to the movable iron core 84 moves toward the axial left side, and the axial left end of the rod 252 comes into contact with the bottom surface of the concave portion 251b. When the electromagnetic force $F_{sol}$ exceeds the urging force $F_{sp2}$ of the spring 19 and the urging force $F_{bel}$ of the bellows 18 (i.e., $F_{sol} > F_{sp2} + F_{bel}$), the movable iron core 84 is further pulled toward the center post 82 side, both the rod 252 fixed to the movable iron core 84 and the valve body 251 coming into contact with the rod 252 move toward the axial left side, that is, in the valve opening direction, and the tapered surface portion 51a of the valve body 251 is separated from the valve seat 10a of the valve housing 10. In this way, the valve 50 is opened.

In this way, since the valve body 251 and the rod 252 are supported by the spring 19 while being separated from each other in the axial direction in a non-fastened state, it is possible to improve the vibration resistance of the valve body 251 and the rod 252. Specifically, even when a vibration occurs in the rod 252 constituting the solenoid 80 due to a disturbance or the like, the vibration is absorbed by the spring 19 and the transmission to the valve body 251 is suppressed. Accordingly, since the closed state of the expansion valve V4 is stabilized, the sealing property is improved and the valve leakage can be reduced.

Fifth Embodiment

An expansion valve according to a fifth embodiment of the present invention will be described with reference to FIG. 10. In addition, the description of the overlapping configuration in the same configuration as that of the first embodiment will be omitted.

Figure 10:
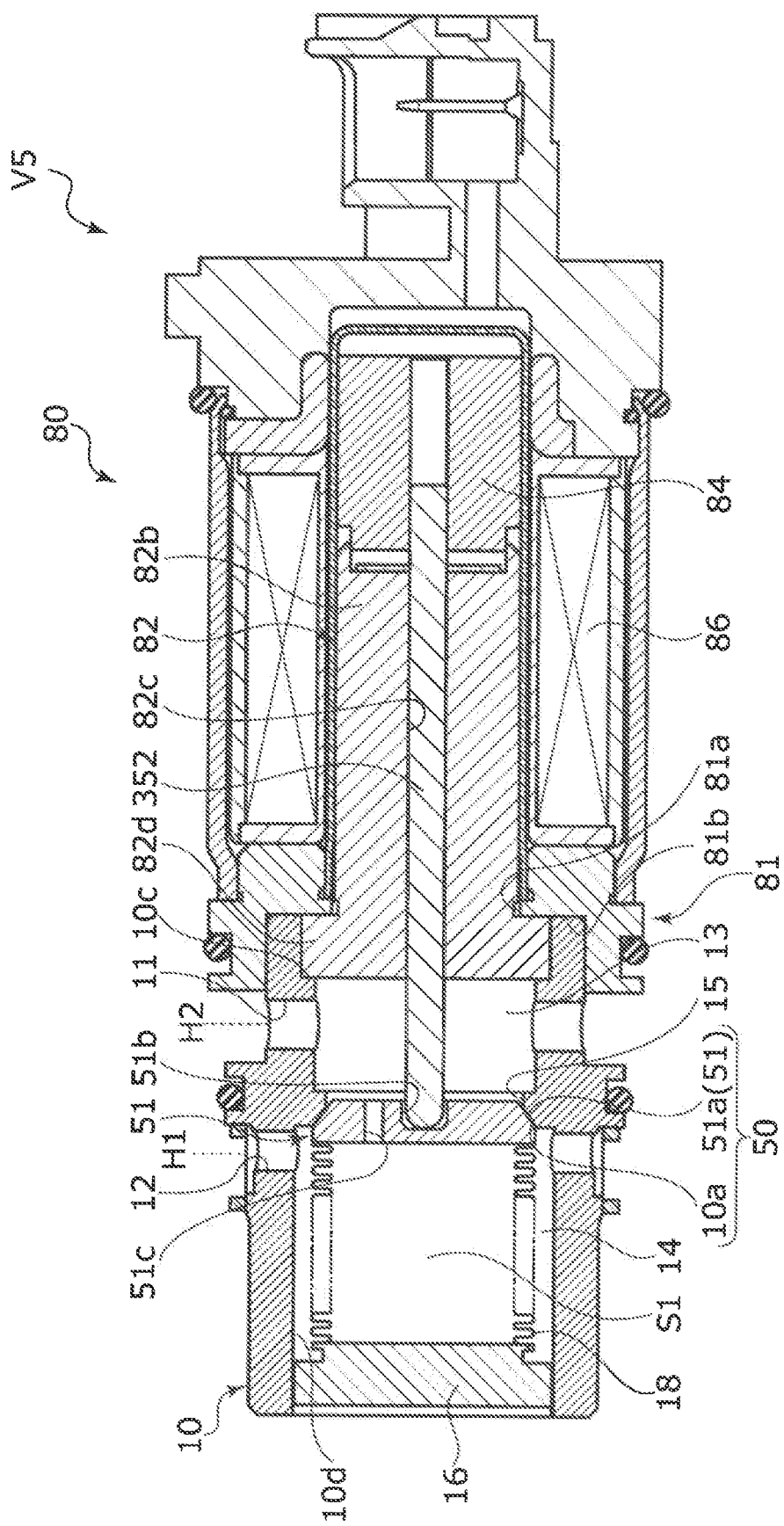
FIG. 10 is a cross-sectional view showing a structure of an expansion valve according to a fifth embodiment of the present invention.

As shown in FIG. 10, the valve body 51 in the fifth embodiment includes the concave portion 51b which is formed at the center portion to open toward the axial right side and an axial left end portion of a rod 352 disposed to penetrate the coil 86 of the solenoid 80 is inserted into the concave portion 51b. The axial left end portion of the rod 352 is formed on a substantially semispherical surface and comes into point contact with the bottom surface of the concave portion 51b.

In this way, since the valve body 51 and the rod 352 are not fastened to each other and the axial left end portion of the rod 352 formed on the substantially semispherical surface comes into point contact with the bottom surface of the concave portion 51b, the correction of the tilting during driving which is seen in the case of the surface contact does not occur even when the rod 352 or the valve body 51 is tilted. Therefore, it is possible to suppress the tilting of the movable iron core 84 or the rod 352 and an increase in the contact resistance between the these and the members constituting the solenoid 80 and to reduce the influence on the operability of the expansion valve V5.

Sixth Embodiment

An expansion valve according to a sixth embodiment of the present invention will be described with reference to FIG. 11. In addition, the description of the overlapping configuration in the same configuration as that of the first embodiment will be omitted.

Figure 11:
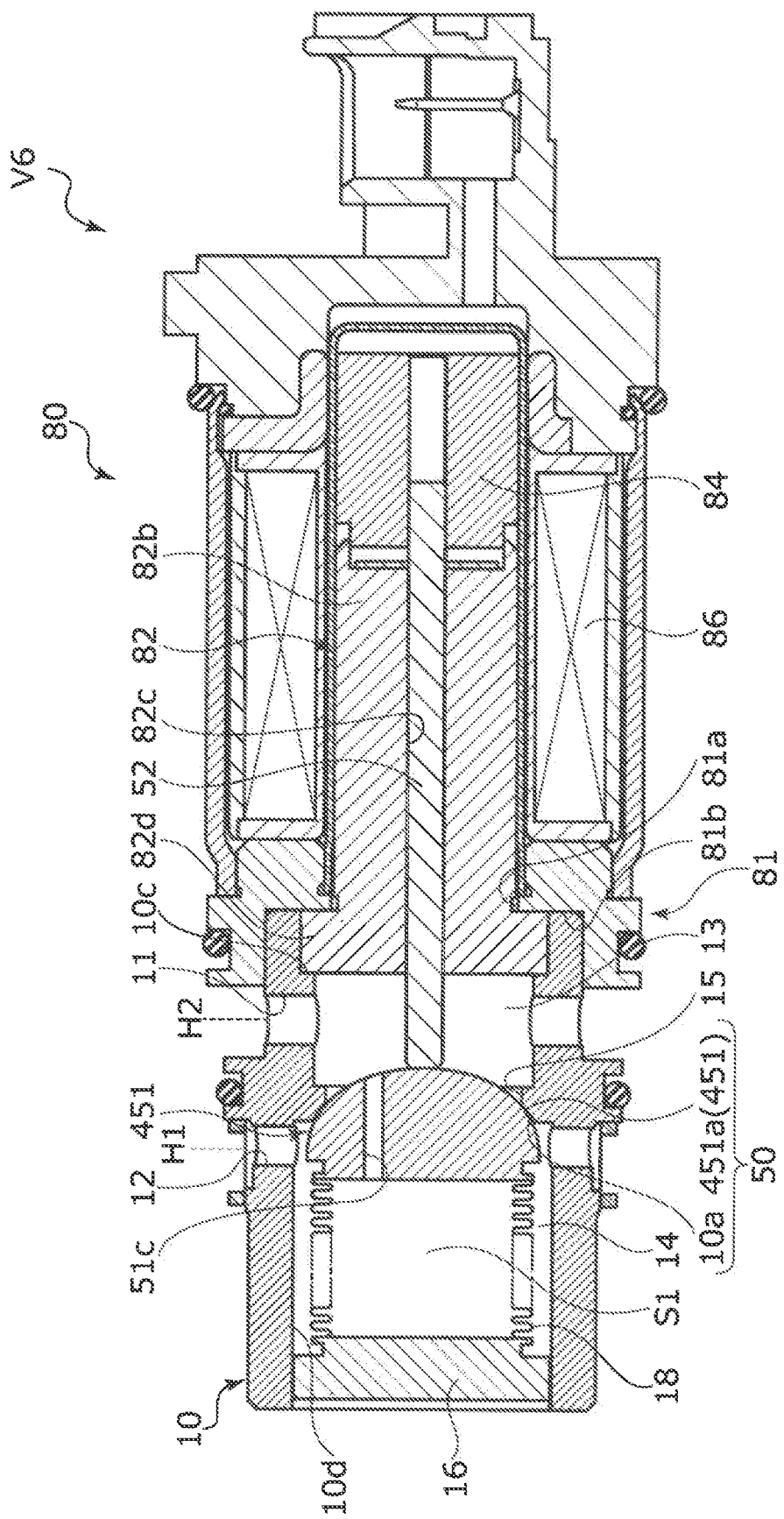
FIG. 11 is a cross-sectional view showing a structure of an expansion valve according to a sixth embodiment of the present invention.

As shown in FIG. 11, in a valve body 451 in the sixth embodiment, an axial right end surface is formed as a substantially semispherical surface and the axial left end of the rod 52 disposed to penetrate the coil 86 of the solenoid 80 comes into point contact with the center portion.

In this way, since the valve body 451 and the rod 52 are not fastened to each other and the axial left end of the rod 52 comes into point contact with the center portion of the axial left end surface of the valve body 451 formed on the substantially semispherical surface, the correction of the tilting during driving which is seen in the case of the surface contact does not occur even when the rod 52 or the valve body 451 is tilted. Therefore, it is possible to suppress the tilting of the movable iron core 84 or the rod 52 and an increase in the contact resistance between the these and the members constituting the solenoid 80 and to reduce the influence on the operability of the expansion valve V6.

Further, when the valve body 451 is pressed toward the axial right side, that is, in the valve closing direction due to the urging force of the bellows 18 in a state in which an expansion valve V6 is not energized, that is, the valve 50 is closed, the outer diameter portion 451a of the axial right end surface formed as a substantially semispherical surface of the valve body 451 sits on the valve seat 10a. Accordingly, since the outer diameter portion 451a reliably sits on the valve seat 10a even when the valve body 451 is tilted, the sealing property is improved and the valve leakage can be reduced.

In addition, when the axial right end surface of the valve body 451 is formed such that the vicinity of the center portion contacting the axial left end of the rod 52 is a part of the spherical surface, a portion sitting on the valve seat 10a in the valve body 451 may be formed by, for example, the tapered surface portion 51a as in the first embodiment.

Seventh Embodiment

An expansion valve according to a seventh embodiment of the present invention will be described with reference to FIG. 12. In addition, the description of the overlapping configuration in the same configuration as that of the first embodiment will be omitted.

Figure 12:
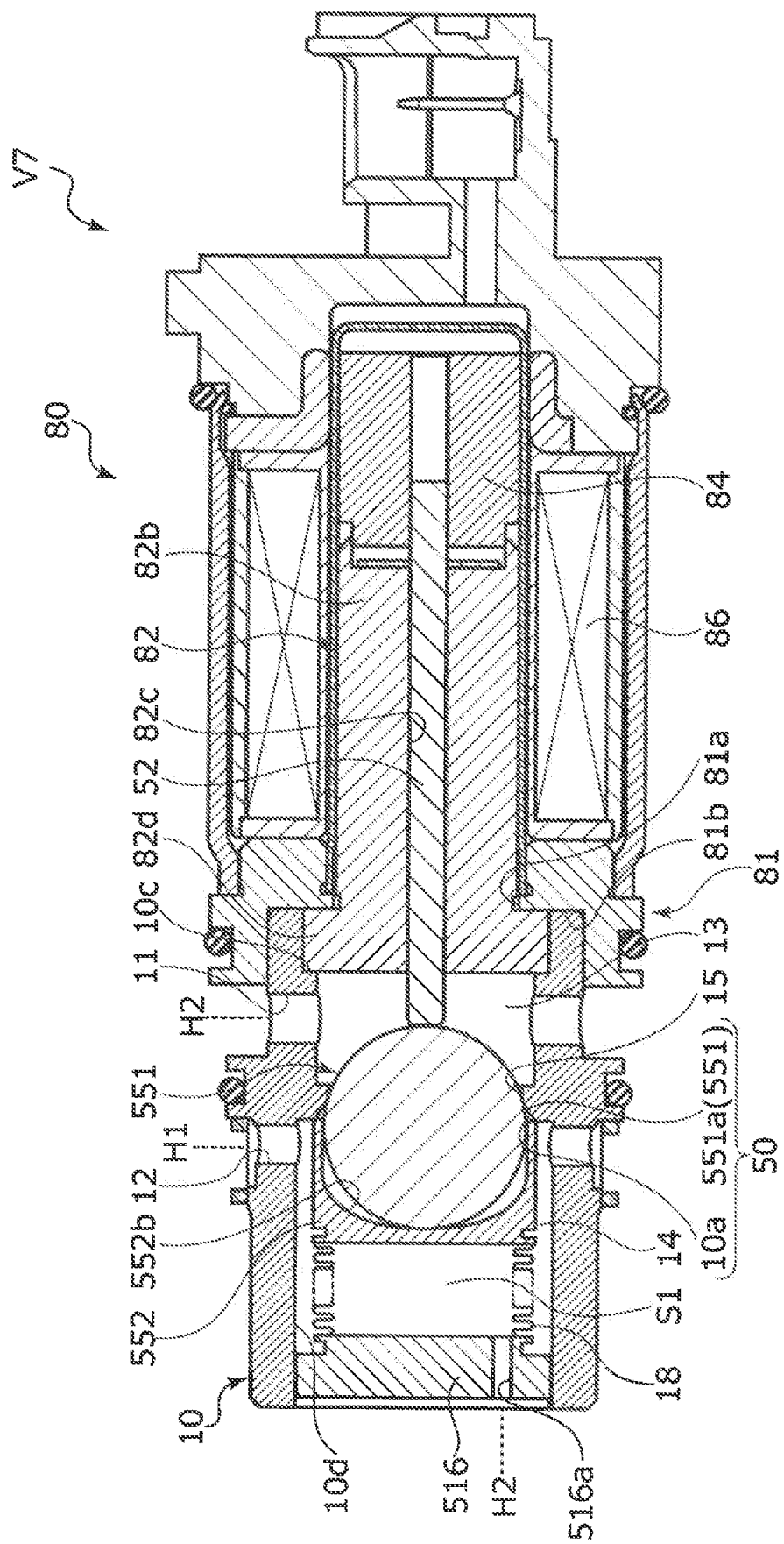
FIG. 12 is a cross-sectional view showing a structure of an expansion valve according to a seventh embodiment of the present invention.

As shown in FIG. 12, a valve body 551 in the seventh embodiment is formed as a steel ball which is fixed by caulking or press-fitting to a concave portion 552b opening toward the axial right side of an adapter 552 to which the axial right end of the bellows 18 is hermetically fixed and the axial left end of the rod 52 disposed to penetrate the coil 86 of the solenoid 80 comes into point contact with the spherical surface of the valve body 551 disposed inside the secondary pressure chamber 13.

Further, a communication path 516a penetrating in the axial direction is formed in a lid member 516 hermetically fixed to the axial left end of the bellows 18. The communication path 516a communicates with the evaporator H2 through an orifice (not shown) provided outside an expansion valve V7. That is, the refrigerant of the secondary pressure P2 supplied from the outlet port 11 to the evaporator H2 flows into the space S1 formed inside the bellows 18.

In this way, in the expansion valve V7, the space S1 is formed on the driving direction side of the solenoid 80 in relation to the valve body 551, that is, the valve opening direction side of the valve body 551. The refrigerant of the secondary pressure chamber 13 having a pressure lower than that of the refrigerant of the primary pressure chamber 14 flows into the space S1 through the orifice (not shown) formed outside the expansion valve V7 and the communication path 516a formed in the lid member 516. Accordingly, when the valve 50 is switched from the closed state to the open state, the influence of the differential pressure applied to both sides in the moving direction of the valve body 551 is small and the valve body 551 accurately strokes with respect to the current value applied to the solenoid 80. In this way, it is possible to adjust the valve opening degree with high accuracy by the valve body 551.

Further, since the valve body 551 and the rod 52 are not fastened to each other and the axial left end of the rod 52 comes into point contact with the spherical surface of the valve body 551 disposed inside the secondary pressure chamber 13, the correction of the tilting during driving which is seen in the case of the surface contact does not occur even when the rod 52 or the valve body 551 is tilted. Therefore, it is possible to suppress the tilting of the movable iron core 84 or the rod 52 and an increase in the contact resistance between the these and the members constituting the solenoid 80 and to reduce the influence on the operability of the expansion valve V7.

Further, when the valve body 551 is pressed toward the axial right side, that is, in the valve closing direction by the urging force of the bellows 18 in a state in which an expansion valve V7 is not energized, that is, the valve 50 is closed, a spherical surface portion 551a of the valve body 551 sits on the valve seat 10a. Accordingly, since the spherical surface portion 551a reliably sits on the valve seat 10a even when the valve body 551 is tilted, the sealing property is improved and the valve leakage can be reduced.

Further, since the steel ball is used as the valve body 551, the valve body can be resistant to mechanical wear.

Although the embodiments of the present invention have been described above with reference to the drawings, the specific configuration is not limited to these examples and is included in the present invention even if there are changes or additions within the scope of the present invention.

For example, in the first to third embodiments, an example has been described in which the valve body is formed as a member separated from the rod disposed to penetrate the coil of the solenoid, but the present invention is not limited thereto. That is, the valve body and the rod may be integrally formed with each other.

Further, in the first to seventh embodiments, an example has been described in which the valve seat is integrally formed with the valve housing, but the valve seat may be formed separately from the valve housing.

Further, in the second embodiment, an example has been described in which the valve seat and the guide surface are integrally formed on the inner peripheral surface of the valve housing, but the present invention is not limited thereto. That is, the valve housing including the valve seat and the valve housing including the guide surface may be formed as separate members.

Further, the guide surface is not limited to that formed in the valve housing and may be formed, for example, in a part of the through-hole of the center post.

Further, in the first to seventh embodiments, an example has been described in which the urging member is disposed inside the space on the valve opening direction side of the valve body, but the urging member may be disposed at a position other than the space on the valve opening direction side of the valve body such as the solenoid side.

Further, in the first, second, fourth to sixth embodiments, an example has been described in which the space and the outlet port communicate with each other through the communication path formed in the valve body, but the present invention is not limited thereto. That is, the communication path may be formed in the valve housing. Further, the configuration of the communication path may be omitted and the valve housing forming the space may be formed or a different port communicating with the evaporator may be formed in the lid member as in the seventh embodiment.

REFERENCE SIGNS LIST

10 Valve housing
10a Valve seat
10b Guide surface
11 Outlet port
12 Inlet port
13 Secondary pressure chamber
14 Primary pressure chamber
17 Spring (urging member)
18 Bellows (urging member)
50 Valve
51 Valve body
51c Communication path
80 Solenoid
100 Valve housing
150 Valve
151 Valve body
151c Communication path
251 Valve body
252 Rod
252a Flange portion
352 Rod
451 Valve body
516 Lid member 516a Communication path
551 Valve body
552 Adapter
A, B Effective pressure receiving area
A', B' Effective pressure receiving area
C Compressor
H1 Heat exchanger (condenser)
H2 Heat exchanger (evaporator)
R Refrigeration cycle
S1 to S3 Space
V1 to V7 Expansion valve

The invention claimed is:

1. An expansion valve, comprising:
a valve housing which is provided with an inlet port allowing a refrigerant from a condenser to pass therethrough and an outlet port allowing a refrigerant toward an evaporator to pass therethrough;
a valve body which is driven by a solenoid;
a valve seat on which the valve body sits; and
an urging member configured to urge the valve body in a valve closing direction,
wherein a space is formed on a valve opening direction side of the valve body,
the refrigerant on the valve closing direction side in relation to the valve body flows into the space through a communication path, and
the space is closed except for a communication through the communication path.

2. The expansion valve according to claim 1, wherein the urging member is disposed in the space.

3. The expansion valve according to claim 1, wherein the outlet port is provided on the valve closing direction side in relation to the valve seat, and
the space with the outlet port communicate with each other through the communication path.

4. The expansion valve according to claim 3, wherein the communication path is formed in the valve body.

5. The expansion valve according to claim 3, wherein the urging member is a bellows, and
the space and the inlet port are partitioned by the bellows.

6. The expansion valve according to claim 5, wherein an effective pressure receiving area of the valve body is equal to an effective pressure receiving area of the bellows.

7. The expansion valve according to claim 2, wherein the outlet port is provided on the valve closing direction side in relation to the valve seat, and
a communication path is provided to communicate the space with the outlet port.

8. The expansion valve according to claim 7, wherein the communication path is formed in the valve body.

9. The expansion valve according to claim 4, wherein the urging member is a bellows, and
the space and the inlet port are partitioned by the bellows.

10. The expansion valve according to claim 9, wherein an effective pressure receiving area of the valve body is equal to an effective pressure receiving area of the bellows.

11. The expansion valve according to claim 7, wherein the space and the inlet port are partitioned by a bellows.

12. The expansion valve according to claim 8, wherein the urging member is a bellows; and
an effective pressure receiving area of the valve body is equal to an effective pressure receiving area of the bellows.

* * * * *